US010171346B2

(12) United States Patent
Li

(10) Patent No.: US 10,171,346 B2
(45) Date of Patent: Jan. 1, 2019

(54) METHOD, APPARATUS AND SYSTEM FOR TRANSMITTING INFORMATION

(71) Applicant: Huawei Technologies Co., Ltd., Shenzhen (CN)

(72) Inventor: Gang Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 215 days.

(21) Appl. No.: 15/199,178

(22) Filed: Jun. 30, 2016

(65) Prior Publication Data
US 2017/0005912 A1 Jan. 5, 2017

Related U.S. Application Data

(63) Continuation of application No. PCT/CN2013/090948, filed on Dec. 30, 2013.

(51) Int. Cl.
*H04L 12/715* (2013.01)
*H04L 12/741* (2013.01)
(Continued)

(52) U.S. Cl.
CPC .............. *H04L 45/22* (2013.01); *H04L 45/64* (2013.01); *H04L 45/745* (2013.01); *H04L 47/23* (2013.01); *H04L 47/24* (2013.01); *H04L 45/50* (2013.01)

(58) Field of Classification Search
CPC ......... H04L 45/22; H04L 45/50; H04L 45/64; H04L 45/745; H04L 47/23; H04L 47/24
See application file for complete search history.

(56) References Cited

U.S. PATENT DOCUMENTS

2011/0038253 A1* 2/2011 Yabusaki ............... H04L 45/02
370/217
2011/0080830 A1 4/2011 Ko et al.
(Continued)

FOREIGN PATENT DOCUMENTS

CN 101714947 A 5/2010
CN 102075421 A 5/2011
(Continued)

OTHER PUBLICATIONS

"OpenFlow Switch Specification," Version 1.3.0, pp. 1-128, Open Networking Foundation (Sep. 6, 2012).
(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

Embodiments of the present invention provide a method, an apparatus and a system for transmitting information. The method for transmitting information includes: a controller determines a work path and a protection path, where the work path corresponds to a first tag, and the protection path corresponds to a second tag; the controller transmits first information to a first apparatus to instruct the first apparatus to transmit, according to the first information, a second message and a fourth message to a second apparatus via the work path and the protection path respectively; the controller transmits second information to the second apparatus to instruct the second apparatus to receive the second message via the work path according to the second information, drop the fourth message received from the protection path, and output the first message in further.

9 Claims, 18 Drawing Sheets

(51) Int. Cl.
*H04L 12/707* (2013.01)
*H04L 12/815* (2013.01)
*H04L 12/851* (2013.01)
*H04L 12/723* (2013.01)

(56) References Cited

U.S. PATENT DOCUMENTS

| | | | | |
|---|---|---|---|---|
| 2011/0261723 | A1* | 10/2011 | Yamato | H04L 45/34 370/255 |
| 2014/0036673 | A1 | 2/2014 | Ehara | |
| 2014/0119193 | A1* | 5/2014 | Anand | H04L 45/28 370/237 |
| 2014/0185429 | A1* | 7/2014 | Takase | H04L 45/28 370/225 |
| 2015/0172173 | A1* | 6/2015 | Mitsumori | H04L 45/28 370/225 |
| 2016/0112329 | A1 | 4/2016 | Ding et al. | |

FOREIGN PATENT DOCUMENTS

| | | |
|---|---|---|
| CN | 102882746 A | 1/2013 |
| CN | 103281246 A | 9/2013 |
| CN | 103354522 A | 10/2013 |
| WO | WO 2012098774 A1 | 7/2012 |

OTHER PUBLICATIONS

"OpenFlow Switch Specification," Version 1.4.0, pp. 1-206, Open Networking Foundation (Oct. 12, 2013).

"IEEE Standards for Local and metropolitan area networks—Virtual Bridged Local Area Networks," IEEE Standards, IEEE Std 802.1Q, pp. 0-312, The Institute of Electrical and Electronics Engineers, New York, New York (May 7, 2003).

"OpenFlow Switch Specification," Version 1.3.1 pp. 1-128, Open Networking Foundation (Sep. 6, 2012).

"OpenFlow Switch Specification," Version 1.4.0, pp. 1-206, Open Networking Foundation Oct. 14, 2013.

Mckeown et al., "OpenFlow: Enabling Innovation in Campus Networks," (Mar. 14, 2008).

Sharma et al., "OpenFlow: Meeting carrier-grade recover requirements," Computer Communications, vol. 36, pp. 656-665, Elsevier, Amsterdam, Netherlands (2013).

Sprecher et al., "MPLS Transport Profile (MPLS-TP) Survivability Framework," Internet Engineering Task Force (IETF), Request for Comments: 6372, pp. 1-56, IETF Trust, Reston, Virginia (Sep. 2011).

\* cited by examiner a controller determines a work path and a protection path, where a start node of the work path and the protection path is a first apparatus, an end node of the work path and the protection path is a second apparatus, the work path corresponds to a first tag, and the protection path corresponds to a second tag ~11 the controller transmits first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message ~12 the controller transmits second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined to be live by the second apparatus, and a group type of the second group entry is fast failover ~13

FIG. 1 a second apparatus receives second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover — 21 the second apparatus drops the fourth message according to the protection path flow entry, pops the first tag in the second message according to the work path flow entry and outputs the first message — 22

FIG. 2 a first apparatus receives first information transmitted by a controller, where the first information includes a first flow entry and a first group entry; where the first flow entry includes a match field and an instruction field, the match filed includes a destination identifier, and the instruction field includes a first group action, an operand of the first group action is a first group identifier, and the first group action is used for instructing the first apparatus to associate the first flow entry with the first group entry; the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, the third message is the same as the first message — 31 the first apparatus transmits the second message to a second apparatus via a work path according to the first information, and transmits the fourth message to the second apparatus via a protection path — 32

FIG. 3

First flow entry

| Match field | Instruction field |
|---|---|
| 1.0.0.0/8 | Group 1 |

First group entry

| Group identifier item | Group type | Action bucket |
|---|---|---|
| 1 | ALL | Push tag 10, output from a port P1 |
| | | Push tag 11, output from a port P2 |

```
┌─────────────────────────────────────────────────────────┐
│  a controller determines a work path and a protection   │
│     path, where a start node of the work path and       │
│   the protection path is a first apparatus, an end      │
│   node of the work path and the protection path is      │    91
│   a second apparatus, the work path corresponds to      │
│        a first tag, and the protection path             │
│              corresponds to a second tag                │
└─────────────────────────────────────────────────────────┘
                            │
                            ▼
┌─────────────────────────────────────────────────────────┐
│   the controller transmits first information to the    │
│   first apparatus, where the first information         │
│   includes a first flow entry and a first group       │
│   entry; the first flow entry includes a match field  │
│   and an instruction field, where the match field     │
│   includes a destination identifier, and the          │
│   instruction field includes a first group action, an │
│   operand of the first group action is a first group  │
│   identifier, the first group action is used for      │
│   instructing the first apparatus to associate the    │
│   first flow entry with the first group entry, the    │
│   first group entry includes a first action bucket    │    92
│   and a second action bucket, a group type of the     │
│   first group entry is ALL; where the first action    │
│   bucket is used for instructing the first apparatus  │
│   to push the first tag into a first message matching │
│   the first flow entry to generate a second message,  │
│   and transmit the second message to the second       │
│   apparatus via the work path, the second action      │
│   bucket is used for instructing the second apparatus │
│   to push the second tag into a third message to      │
│   generate a fourth message, and transmit the fourth  │
│   message to the second apparatus via the protection  │
│   path, the third message is the same as the first    │
│                         message                        │
└─────────────────────────────────────────────────────────┘
                            │
                            ▼
┌─────────────────────────────────────────────────────────┐
│   the controller transmits second information to the   │
│   second apparatus, where the second information      │
│   includes a second flow entry; the second flow entry │
│   includes a work path flow entry and a protection    │
│   path flow entry; where a match filed of the work    │
│   path flow entry includes the first tag, and an      │
│   instruction field of the work path flow entry is    │    93
│   used for instructing the second apparatus to pop    │
│   the first tag of the second message and output the  │
│   first message; a match field of the protection path │
│   flow entry includes the second tag, and an          │
│   instruction field of the protection path flow entry │
│   includes a drop action, where the drop action is    │
│   used for instructing the second apparatus to drop   │
│                    the fourth message                  │
└─────────────────────────────────────────────────────────┘
```

FIG. 17

METHOD, APPARATUS AND SYSTEM FOR TRANSMITTING INFORMATION

CROSS-REFERENCE TO RELATED APPLICATIONS

This application is a continuation of International Application No. PCT/CN2013/090948, filed on Dec. 30, 2013, which is hereby incorporated by reference in its entirety.

TECHNICAL FIELD

Embodiments of the present disclosure relate to communication technologies and, in particular, to a method, an apparatus and a system for transmitting information.

BACKGROUND

With continuous development of Internet, an OpenFlow technology emerges. Direction of flow of a data packet in a conventional network is specified manually. Network devices (such as switches or routers) exchange data at the packet level. In an OpenFlow network, a controller can determine a transmission path of a data packet in the network. The OpenFlow technology converts a data packet forwarding process originally controlled by the switch/router into a process which is respectively completed by the OpenFlow switch and the controller.

In a situation of an OpenFlow controlled data network, an existing OpenFlow technology cannot support a service with a higher quality of service (quality of service, QoS for short) requirement.

SUMMARY

The present disclosure provides a method, an apparatus and a system for transmitting information, which help to provide better support for a service with a higher QoS requirement.

In a first aspect, an embodiment of the present invention provides a method for transmitting information, including:

determining, by a controller, a work path and a protection path, where a start node of the work path and the protection path is a first apparatus, an end node of the work path and the protection path is a second apparatus, the work path corresponds to a first tag, and the protection path corresponds to a second tag;

transmitting, by the controller, first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and transmitting, by the controller, second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined by the second apparatus to be live, and a group type of the second group entry is fast failover.

With reference to the first aspect, in a first possible implementation of the first aspect, the third action bucket includes a first action which is used for instructing the second apparatus to watch whether a failure occurs on the work path, and the fourth action bucket includes a second action which is used for instructing the second apparatus to watch whether a failure occurs on the protection path.

With reference to the first possible implementation of the first aspect, in a second possible implementation of the first aspect, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

With reference to the first or the second possible implementation of the first aspect, in a third possible implementation of the first aspect, receiving, by the controller, the updated protection path flow entry transmitted by the second apparatus.

In a second aspect, an embodiment of the present invention provides a method for transmitting information, including:

receiving, by a second apparatus, second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover; and dropping, by the second apparatus, the fourth message according to the protection path flow entry, popping the first tag in the second message according to the work path flow entry and outputting the first message;

where the second message is generated by a first apparatus through pushing the first tag into the first message, the fourth message is generated by the first apparatus through pushing the second tag into the third message, the third message is the same as the first message, the first tag corresponds to the work path, the second tag corresponds to the protection path, the work path and the protection path are determined by the controller, a start node of the work path and the protection path is the first apparatus, and an end node of the work path and the protection path is the second apparatus.

With reference to the second aspect, in a first possible implementation of the second aspect, the third action bucket includes a first action which is used for instructing the second apparatus to watch whether a failure occurs on the work path, and the fourth action bucket includes a second action which is used for instructing the second apparatus to watch whether a failure occurs on the protection path.

With reference to the first possible implementation of the second aspect, in a second possible implementation of the second aspect, the second apparatus determines that a failure occurs on the work path according to the second action;

based on the determined result, determining, by the second apparatus, the fourth action bucket in the second group entry to be live; and updating the drop action in the instruction field of the protection path flow entry as the second group action, where an operand of the second group action is the second group identifier, and the second group action is used for instructing the second apparatus to associate the protection path flow entry with the second group entry.

With reference to the first possible implementation of the second aspect, in a third possible implementation of the second aspect, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

With reference to the third possible implementation of the second aspect, in fourth possible implementation of the second aspect, the second apparatus determines that a failure occurs on the work path according to the first state information;

based on the determined result, determining, by the second apparatus, the fourth action bucket in the second group entry to be live; and updating the drop action in the instruction field of the protection path flow entry as the second group action, where an operand of the second group action is the second group identifier, and the second group action is used for instructing the second apparatus to associate the protection path flow entry with the second group entry.

With reference to the second or the fourth possible implementation of the second aspect, in a fifth possible implementation of the second aspect, transmitting, by the second apparatus, the updated protection path flow entry to the controller.

In a third aspect, an embodiment of the present invention provides a method for transmitting information, including:

receiving, by a first apparatus, first information transmitted by a controller, where the first information includes a first flow entry and a first group entry; where the first flow entry includes a match filed and an instruction field, the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, the third message is the same as the first message; and transmitting, by the first apparatus, the second message to a second apparatus via a work path according to the first information, and transmitting the fourth message to the second apparatus via a protection path;

where the work path and the protection path are determined by the controller, a start node of the work path and the protection path is the first apparatus, an end node of the work path and the protection path is the second apparatus, the work path corresponds to the first tag, and the protection path corresponds to the second tag.

In a fourth aspect, an embodiment of the present invention provides a method for transmitting information, including:

determining, by a controller, a work path and a protection path, where a start node of the work path and the protection path is a first apparatus, an end node of the work path and the protection path is a second apparatus, the work path corresponds to a first tag, and the protection path corresponds to a second tag;

transmitting, by the controller, first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message;

transmitting, by the controller, second information to the second apparatus, where the second information includes a second flow entry; the second flow entry includes a work path flow entry and a protection path flow entry; where a match filed of the work path flow entry includes the first tag, and an instruction field of the work path flow entry is used for instructing the second apparatus to pop the first tag of the second message and output the first message; a match field of the protection path flow entry includes the second tag, and an instruction field of the protection path flow entry includes a drop action, where the drop action is used for instructing the second apparatus to drop the fourth message.

With reference to the fourth aspect, in a first possible implementation of the fourth aspect, after receiving a notification message indicating that a failure occurs on the work path, transmitting, by the controller, a flow table updating message to the second apparatus, where the flow table updating message is used for instructing the second apparatus to update the protection path flow entry as a new protection path flow entry; a match field of the new protection path flow entry includes the second tag, and an instruction field of the new protection path flow entry is used for instructing the second apparatus to pop the second tag in a sixth message and output a fifth message, where the sixth message is generated by the first apparatus through pushing the second tag into the fifth message.

With reference to the first possible implementation of the fourth aspect, in a second possible implementation of the fourth aspect, the flow table updating message is further configured to instruct the second apparatus to update the work path flow entry as a new work path flow entry; a match field of the new work path flow entry includes the first tag, and an instruction field of the new work path flow entry is used for instructing the second apparatus to drop an eighth message, where the eighth message is generated by the first apparatus through pushing the first tag into a seventh message.

In a fifth aspect, an embodiment of the present invention provides a method for transmitting information, including:

receiving, by a second apparatus, second information transmitted by a controller, where the second information includes a second flow entry, the second flow entry includes a work path flow entry and a protection path flow entry; where a match field of the work path flow entry includes a first tag, and an instruction field of the work path flow entry is used for instructing the second apparatus to pop the first tag in a second message and output a first message; a match field of the protection path flow entry includes a second tag, and an instruction field of the protection path flow entry includes a drop action;

popping, by the second apparatus, the first tag in the second message according to the work path flow entry, outputting the first message, and dropping a fourth message according to the protection path flow entry;

where the work path and the protection path are determined by the controller, a first apparatus is a start node of the work path and the protection path, the second apparatus is an end node of the work path and the protection path, the first tag is a tag corresponding to the work path, and the second tag is a tag corresponding to the protection path.

With reference to the fifth aspect, in a first possible implementation of the fifth aspect, receiving, by the second apparatus, a flow table updating message transmitted by the controller, where the flow table updating message is used for instructing the second apparatus to update the protection path flow entry as a new protection path flow entry, and the flow table updating message is generated by the controller based on a notification message indicating that a failure occurs on the work path as received by the controller; a match field of the new protection path flow entry includes the second tag, the new protection path flow entry is used for instructing the second apparatus to pop the second tag in a sixth message and output a fifth message, the sixth message is generated by the first apparatus through pushing the second tag into the fifth message, and the sixth message is transmitted by the first apparatus to the second apparatus via the protection path.

With reference to the first possible implementation of the fifth aspect, in a second possible implementation of the fifth aspect, the flow table updating message is further configured to instruct the second apparatus to update the work path flow entry as a new work path flow entry; a match field of the new work path flow entry includes the first tag, the new work path flow entry is used for instructing the second apparatus to drop an eighth message, where the eighth message is generated by the first apparatus through pushing the first tag into a seventh message, and the eighth message is transmitted by the first apparatus to the second apparatus via the work path.

In a sixth aspect, an embodiment of the present invention provides a controller, including:

a determining unit, configured to determine a work path and a protection path, where a start node of the work path and the protection path is a first apparatus, an end node of the work path and the protection path is a second apparatus, the work path corresponds to a first tag, and the protection path corresponds to a second tag;

a first transmitting unit, configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and a second transmitting unit, configured to transmit second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined by the second apparatus to be live, and a group type of the second group entry is fast failover.

With reference to the sixth aspect, in a first possible implementation of the sixth aspect, the third action bucket includes a first action which is used for instructing the second apparatus to watch whether a failure occurs on the work path, and the fourth action bucket includes a second action which is used for instructing the second apparatus to watch whether a failure occurs on the protection path.

With reference to the first possible implementation of the sixth aspect, in a second possible implementation of the sixth aspect, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

With reference to the first or the second possible implementation of the sixth aspect, in a third possible implementation of the sixth aspect, further including:

a receiving unit, configured to receive the updated protection path flow entry transmitted by the second apparatus.

In a seventh aspect, an embodiment of the present invention provides a second apparatus, including:

a receiving unit, configured to receive second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover; and a processing unit, configured to drop the fourth message according to the protection path flow entry, pop the first tag in the second message according to the work path flow entry and output the first message;

where the second message is generated by a first apparatus through pushing the first tag into the first message, the fourth message is generated by the first apparatus through pushing the second tag into the third message, the third message is the same as the first message, the first tag corresponds to the work path, the second tag corresponds to the protection path, the work path and the protection path are determined by the controller, a start node of the work path and the protection path is the first apparatus, and an end node of the work path and the protection path is the second apparatus.

With reference to the seventh aspect, in a first possible implementation of the seventh aspect, in the second information received by the second apparatus, the third action bucket includes a first action which is used for instructing the second apparatus to watch whether a failure occurs on the work path, and the fourth action bucket includes a second action which is used for instructing the second apparatus to watch whether a failure occurs on the protection path.

With reference to the first possible implementation of the seventh aspect, in a second possible implementation of the seventh aspect, the second apparatus further includes a first updating unit, which is configured to determine that a failure occurs on the work path according to the second action; based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

With reference to the first possible implementation of the seventh aspect, in a third possible implementation of the seventh aspect, in the second information received by the second apparatus, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

With reference to the third possible implementation of the seventh aspect, in a fourth possible implementation of the seventh aspect, the second apparatus further includes a second updating unit, which is configured to determine that a failure occurs on the work path according to the first state information;

based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

With reference to the second or the fourth possible implementation of the seventh aspect, in a fifth possible implementation of the seventh aspect, the second apparatus further includes a transmitting unit, which is configured to transmit the updated protection path flow entry to the controller.

In an eighth aspect, an embodiment of the present invention provides a first apparatus, including:

a receiving unit, configured to receive first information transmitted by a controller, where the first information includes a first flow entry and a first group entry; where the first flow entry includes a match filed and an instruction field, the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, the third message is the same as the first message; and a processing unit, configured to transmit the second message to a second apparatus via a work path according to the first information, and transmit the fourth message to the second apparatus via a protection path;

where the work path and the protection path are determined by the controller, a start node of the work path and the protection path is the first apparatus, an end node of the work path and the protection path is the second apparatus, the work path corresponds to the first tag, and the protection path corresponds to the second tag.

In a ninth aspect, an embodiment of the present invention provides a controller, including:

a determining unit, configured to determine a work path and a protection path, where a start node of the work path and the protection path is a first apparatus, an end node of the work path and the protection path is a second apparatus, the work path corresponds to a first tag, and the protection path corresponds to a second tag;

a first transmitting unit, configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message;

a second transmitting unit, configured to transmit second information to the second apparatus, where the second information includes a second flow entry; the second flow entry includes a work path flow entry and a protection path flow entry; where a match filed of the work path flow entry includes the first tag, and an instruction field of the work path flow entry is used for instructing the second apparatus to pop the first tag of the second message and output the first message; a match field of the protection path flow entry includes the second tag, and the instruction field of the protection path flow entry includes a drop action, where the drop action is used for instructing the second apparatus to drop the fourth message.

With reference to the ninth aspect, in a first possible implementation of the ninth aspect, the controller further includes a third transmitting unit, which is configured to: after receiving a notification message indicating that a failure occurs on the work path, transmit a flow table updating message to the second apparatus, where the flow table updating message is used for instructing the second apparatus to update the protection path flow entry as a new protection path flow entry; a match field of the new protection path flow entry includes the second tag, and an instruction field of the new protection path flow entry is used for instructing the second apparatus to pop the second tag in a sixth message and output a fifth message, where the sixth message is generated by the first apparatus through pushing the second tag into the fifth message.

With reference to the first possible implementation of the ninth aspect, in a second possible implementation of the ninth aspect, the flow table updating message transmitted by the third transmitting unit is further configured to instruct the second apparatus to update the work path flow entry as a new work path flow entry; a match field of the new work path flow entry includes the first tag, and an instruction field of the new work path flow entry is used for instructing the second apparatus to drop an eighth message, where the eighth message is generated by the first apparatus through pushing the first tag into a seventh message.

In a tenth aspect, an embodiment of the present invention provides a second apparatus, including:

a first receiving unit, configured to receive second information transmitted by a controller, where the second information includes a second flow entry, the second flow entry includes a work path flow entry and a protection path flow entry; where a match field of the work path flow entry includes a first tag, and an instruction field of the work path flow entry is used for instructing the second apparatus to pop the first tag in a second message and output a first message; a match field of the protection path flow entry includes a second tag, and an instruction field of the protection path flow entry includes a drop action;

a first processing unit, configured to pop the first tag in the second message according to the work path flow entry, output the first message, and drop a fourth message according to the protection path flow entry;

where the work path and the protection path are determined by the controller, a first apparatus is a start node of the work path and the protection path, the second apparatus is an end node of the work path and the protection path, the first tag is a tag corresponding to the work path, and the second tag is a tag corresponding to the protection path.

With reference to the tenth aspect, in a first possible implementation of the tenth aspect, the second apparatus further includes:

a second receiving unit, configured to receive a flow table updating message transmitted by the controller, where the flow table updating message is used for instructing the second apparatus to update the protection path flow entry as a new protection path flow entry, and the flow table updating message is generated by the controller based on a notification message indicating that a failure occurs on the work path as received by the controller; a match field of the new protection path flow entry includes the second tag; and a second processing unit, configured to pop the second tag in a sixth message according to the new protection path flow entry and output a fifth message, the sixth message is generated by the first apparatus through pushing the second tag into the fifth message, and the sixth message is transmitted by the first apparatus to the second apparatus via the protection path.

With reference to the first possible implementation of the tenth aspect, in a second possible implementation of the tenth aspect, the flow table updating message received by the second receiving unit is further configured to instruct the second apparatus to update the work path flow entry as a new work path flow entry; a match field of the new work path flow entry includes the first tag;

the second processing unit is further configured to drop an eighth message according to the new work path flow entry, where the eighth message is generated by the first apparatus through pushing the first tag into a seventh message, and the eighth message is transmitted by the first apparatus to the second apparatus via the work path.

In an eleventh aspect, an embodiment of the present invention provides a controller, including:

a processor, configured to determine a work path and a protection path, where a start node of the work path and the protection path is a first apparatus, an end node of the work path and the protection path is a second apparatus, the work path corresponds to a first tag, and the protection path corresponds to a second tag;

a transmitter, configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and is configured to transmit second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined by the second apparatus to be live, and a group type of the second group entry is fast failover.

With reference to the eleventh aspect, in a first possible implementation of the eleventh aspect, in the second information transmitted by the transmitter, the third action bucket includes a first action which is used for instructing the second apparatus to watch whether a failure occurs on the work path, and the fourth action bucket includes a second action which is used for instructing the second apparatus to watch whether a failure occurs on the protection path.

With reference to the first possible implementation of the eleventh aspect, in a second possible implementation of the eleventh aspect, in the second information transmitted by the transmitter, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

With reference to the first or the second possible implementation of the eleventh aspect, in a third possible implementation of the eleventh aspect, the controller further includes a receiver, which is configured to receive the updated protection path flow entry transmitted by the second apparatus.

In a twelfth aspect, an embodiment of the present invention provides a second device, including:

a receiver, configured to receive second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover; and a processor, configured to drop the fourth message according to the protection path flow entry, pop the first tag in the second message according to the work path flow entry and output the first message;

where the second message is generated by a first apparatus through pushing the first tag into the first message, the fourth message is generated by the first apparatus through pushing the second tag into the third message, the third message is the same as the first message, the first tag corresponds to the work path, the second tag corresponds to the protection path, the work path and the protection path are determined by the controller, a start node of the work path and the protection path is the first apparatus, and an end node of the work path and the protection path is the second apparatus.

With reference to the twelfth aspect, in a first possible implementation of the twelfth aspect, the third action bucket includes a first action which is used for instructing the second apparatus to watch whether a failure occurs on the work path, and the fourth action bucket includes a second action which is used for instructing the second apparatus to watch whether a failure occurs on the protection path.

With reference to the first possible implementation of the twelfth aspect, in a second possible implementation of the twelfth aspect, the processor is further configured to:

determine that a failure occurs on the work path according to the second action;

based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

With reference to the first possible implementation of the twelfth aspect, in a third possible implementation of the twelfth aspect, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

With reference to the third possible implementation of the twelfth aspect, in a fourth possible implementation of the twelfth aspect, the processor is further configured to:

determine that a failure occurs on the work path according to the first state information;

based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

With reference to the second or the fourth possible implementation of the twelfth aspect, in a fifth possible implementation of the twelfth aspect, the second device further includes:

a transmitter, configured to transmit the updated protection path flow entry to the controller.

In a thirteenth aspect, an embodiment of the present invention provides a first device, including:

a receiver, configured to receive first information transmitted by a controller, where the first information includes a first flow entry and a first group entry; where the first flow entry includes a match filed and an instruction field, the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, the third message is the same as the first message; and a processor, configured to transmit the second message to a second apparatus via a work path according to the first information, and transmit the fourth message to the second apparatus via a protection path;

where the work path and the protection path are determined by the controller, a start node of the work path and the protection path is the first apparatus, an end node of the work path and the protection path is the second apparatus, the work path corresponds to the first tag, and the protection path corresponds to the second tag.

In a fourteenth aspect, an embodiment of the present invention provides a controller, including:

a processor, configured to determine a work path and a protection path, where a start node of the work path and the protection path is a first apparatus, an end node of the work path and the protection path is a second apparatus, the work path corresponds to a first tag, and the protection path corresponds to a second tag;

a transmitter, configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and is configured to transmit second information to the second apparatus, where the second information includes a second flow entry; the second flow entry includes a work path flow entry and a protection path flow entry; where a match filed of the work path flow entry includes the first tag, and an instruction field of the work path flow entry is used for instructing the second apparatus to pop the first tag of the second message and output the first message; a match field of the protection path flow entry includes the second tag, and the instruction field of the protection path flow entry includes a drop action, where the drop action is used for instructing the second apparatus to drop the fourth message.

With reference to the fourteenth aspect, in a first possible implementation of the fourteenth aspect, the transmitter is further configured to: after receiving a notification message indicating that a failure occurs on the work path, transmit a flow table updating message to the second apparatus, where the flow table updating message is used for instructing the second apparatus to update the protection path flow entry as a new protection path flow entry; a match field of the new protection path flow entry includes the second tag, and an instruction field of the new protection path flow entry is used for instructing the second apparatus to pop the second tag in a sixth message and output a fifth message, where the sixth message is generated by the first apparatus through pushing the second tag into the fifth message.

With reference to the first possible implementation of the fourteenth aspect, in a second possible implementation of the fourteenth aspect, the flow table updating message is further configured to instruct the second apparatus to update the work path flow entry as a new work path flow entry; a match field of the new work path flow entry includes the first tag, and an instruction field of the new work path flow entry is used for instructing the second apparatus to drop an eighth message, where the eighth message is generated by the first apparatus through pushing the first tag into a seventh message.

In a fifteenth aspect, an embodiment of the present invention provides a second device, including:

a receiver, configured to receive second information transmitted by a controller, where the second information includes a second flow entry, the second flow entry includes a work path flow entry and a protection path flow entry; where a match field of the work path flow entry includes a first tag, and an instruction field of the work path flow entry is used for instructing the second apparatus to pop the first tag in a second message and output a first message; a match field of the protection path flow entry includes a second tag, and an instruction field of the protection path flow entry includes a drop action;

a processor, configured to pop the first tag in the second message according to the work path flow entry, output the first message, and drop a fourth message according to the protection path flow entry;

where the work path and the protection path are determined by the controller, a first apparatus is a start node of the work path and the protection path, the second apparatus is an end node of the work path and the protection path, the first tag is a tag corresponding to the work path, and the second tag is a tag corresponding to the protection path.

With reference to the fifteenth aspect, in a first possible implementation of the fifteenth aspect, the receiver is further configured to: receive a flow table updating message transmitted by the controller, where the flow table updating message is used for instructing the second apparatus to update the protection path flow entry as a new protection path flow entry, and the flow table updating message is generated by the controller based on a notification message indicating that a failure occurs on the work path as received by the controller; a match field of the new protection path flow entry includes the second tag; and the new protection path flow entry is used for instructing the second apparatus to pop the second tag in a sixth message and output a fifth message, the sixth message is generated by the first apparatus through pushing the second tag into the fifth message, and the sixth message is transmitted by the first apparatus to the second apparatus via the protection path.

With reference to the first possible implementation of the fifteenth aspect, in a second possible implementation of the fifteenth aspect, the flow table updating message is further configured to instruct the second apparatus to update the work path flow entry as a new work path flow entry; a match field of the new work path flow entry includes the first tag, the new work path flow entry is used for instructing the second apparatus to drop an eighth message, where the eighth message is generated by the first apparatus through pushing the first tag into a seventh message, and the eighth message is transmitted by the first apparatus to the second apparatus via the work path.

In a sixteenth aspect, an embodiment of the present invention provides a system for transmitting information, including:

a controller according to the sixth aspect and any one of the first to the second possible implementations in the sixth aspect, a second apparatus according to the seventh aspect and any one of the first to the second possible implementations in the seventh aspect and a first apparatus according to the eighth aspect.

In a seventeenth aspect, an embodiment of the present invention provides a system for transmitting information, including:

a controller according to the ninth aspect and any one of the first to the second possible implementations in the ninth aspect, a second apparatus according to the tenth aspect and any one of the first to the second possible implementations in the tenth aspect and a first apparatus according to the eighth aspect.

In an eighteenth aspect, an embodiment of the present invention provides a system for transmitting information, including:

a controller according to the eleventh aspect and any one of the first to the second possible implementations in the eleventh aspect, a second device according to the twelfth aspect and any one of the first to the second possible implementations in the twelfth aspect and a first device according to the thirteenth aspect.

In a nineteenth aspect, an embodiment of the present invention provides a system for transmitting information, including:

a controller according to the fourteenth aspect and any one of the first to the second possible implementations in the fourteenth aspect, a second device according to the fifteenth aspect and any one of the first to the second possible implementations in the fifteenth aspect and a first device according to the sixteenth aspect.

Embodiments of the present invention provide a method, an apparatus and a system for transmitting information. A work path and a protection path are determined via a controller. The work path corresponds to a first tag, and the protection path corresponds to a second tag. The controller transmits first information to a first apparatus to instruct the first apparatus to transmit, according to the first information, a second message and a fourth message to a second apparatus via the work path and the protection path respectively. The second message is generated by pushing the first tag into a first message, and the fourth message is generated by pushing the second tag into a third message. The first message is the same as the third message. The above described technical solutions achieve that same information is transmitted via different paths. The controller transmits second information to the second apparatus to instruct the second apparatus to receive the second message via the work path according to the second information, and drop the fourth message received from the protection path. The above described technical solutions achieve a selective reception. Furthermore, the first message is output. The described technical solutions help to support a service with higher QoS requirements. The service placing higher requirements upon QoS may be a banking service or a mobile backhaul service.

BRIEF DESCRIPTION OF DRAWINGS

In order to make technical solutions in embodiments of the present invention or the prior art clearer, accompanying drawings used in the description of embodiments of the present invention or the prior art will be briefly described hereunder. Obviously, the described drawings are merely some embodiments of present invention. For persons skilled in the art, other drawings may be obtained based on these drawings without any creative effort.

FIG. 1 is a schematic flow chart of a method for transmitting information according to Embodiment 1 of the present invention;

FIG. 2 is a schematic flow chart of a method for transmitting information according to Embodiment 2 of the present invention;

FIG. 3 is a schematic flow chart of a method for transmitting information according to Embodiment 3 of the present invention;

FIG. 17 is a schematic flow chart of a method for transmitting information according to Embodiment 7 of the present invention;

DESCRIPTION OF EMBODIMENTS

Figure 4:
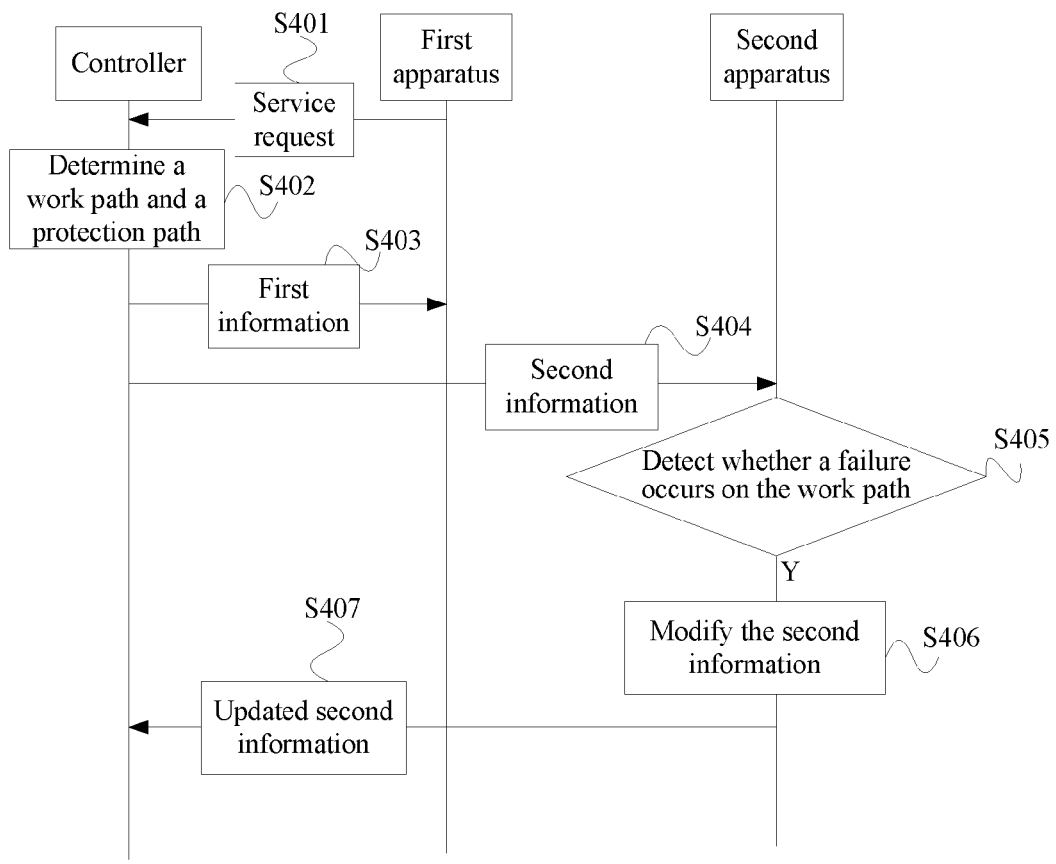
FIG. 4 is a signaling flow chart of a method for transmitting information according to Embodiment 4 of the present invention.

In order to make objectives, technical solutions, and advantages of embodiments of the present invention clearer, the technical solutions in embodiments of the present invention will be described hereunder clearly and completely with reference to accompanying drawings in embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

An implementation scenario of embodiments of the present invention is an OpenFlow network. A controller involved in embodiments of the present invention is an OpenFlow controller.

For a part of technical terms involved in embodiments of the present invention, reference may be made to OpenFlow Switch Specification version 1.4.0. The part of technical terms includes but is not limited to: a flow table (English: flow table), a flow entry (English: flow entry), a group table (English: group table), a group entry (English: group entry), an action (English: action), an action bucket (English: action bucket), an instruction (English: instruction), a group type (English: group type), a group identifier (group identifier), and fast failover (English: fast failover). The action may be: Push-Tag (English: Push-Tag), Pop-Tag (English: Pop-Tag), Drop (English: Drop), Output (English: Output) or Group (English: Group).

A group action may be used for instructing to associate a flow entry with a group entry. Specifically, the flow entry may include the group action. An operand of the group action may be a group identifier of the group entry. Persons skilled in the art may understand that, when executing the group action in the flow entry, it needs to access the group entry corresponding to the group identifier.

FIG. 1 is a schematic flow chart of a method for transmitting information according to Embodiment 1 of the present invention, including:

11: a controller determines a work path and a protection path, where a start node of the work path and the protection path is a first apparatus, an end node of the work path and the protection path is a second apparatus, the work path corresponds to a first tag, and the protection path corresponds to a second tag.

For instance, the first apparatus may be a network apparatus. The network apparatus may be a provider edge (English: provider edge, PE for short). The first apparatus may be a service initiator, and may also be an intermediate node.

For instance, the second apparatus may be a network apparatus. The network apparatus may be a PE. The second apparatus may be a service terminator, and may also be an intermediate node.

For instance, the protection path may be a plurality of protection paths. Correspondingly, the second tag may be a plurality of tags. There is a one-to-one correspondence between the plurality of protection paths and the plurality of tags one by one.

12: the controller transmits first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message.

For instance, the destination identifier may be an address of the destination. The address may be an internet protocol (English: internet protocol, IP for short) address, an IP address prefix or a media access control (English: media access control, MAC for short) protocol address. The destination may be a host. The host may be a personal computer, a personal digital assistant or a set-top box.

13: the controller transmits second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined to be live by the second apparatus, and a group type of the second group entry is fast failover.

For instance, the third action bucket may include an Output action. The Output action is used for outputting the first message. The outputting the first message may be forwarding the first message to a next hop network apparatus, and may also be outputting the first message to a module of the second apparatus. The module of the second apparatus may be a module configured to perform IP processing, and may also be a module configured to perform transmission control protocol (English: transmission control protocol, TCP for short) processing. It should be noted that, other embodiments in the present application also relate to outputting a message. The outputting a message may be transmitting the message to a next hop network apparatus, and may also be outputting the message to a module in a local apparatus.

The third action bucket includes a first action which is used for instructing the second apparatus to watch whether a failure occurs on the work path, and the fourth action bucket includes a second action which is used for instructing the second apparatus to watch whether a failure occurs on the protection path.

Optionally, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

Furthermore, the controller receives the updated protection path flow entry transmitted by the second apparatus.

In the above technical solutions, a controller determines a work path and a protection path. The work path corresponds to a first tag, and the protection path corresponds to a second tag. The controller transmits first information to a first apparatus to instruct the first apparatus to transmit, according to the first information, a second message and a fourth message to a second apparatus via the work path and the protection path respectively. The second message is generated by pushing the first tag into a first message, and the fourth message is generated by pushing the second tag into a third message. The first message is the same as the third message. The above described technical solutions achieve that same information is transmitted via different paths. The controller transmits second information to the second apparatus to instruct the second apparatus to receive the second message via the work path according to the second information, and drop the fourth message received from the protection path. The above described technical solutions achieve a selective reception. Furthermore, the first message is output. The technical solutions provided in this embodiment help to support a service with higher quality of service (English: quality of service, QoS for short) requirements. The service with higher QoS requirements may be a banking service or a mobile backhaul service.

FIG. 2 is a schematic flow chart of a method for transmitting information according to Embodiment 2 of the present invention, including:

21: a second apparatus receives second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover.

22: the second apparatus drops the fourth message according to the protection path flow entry, pops the first tag in the second message according to the work path flow entry and outputs the first message.

The second message is generated by a first apparatus through pushing the first tag into the first message, the fourth message is generated by the first apparatus through pushing the second tag into the third message, the third message is the same as the first message, the first tag corresponds to the work path, the second tag corresponds to the protection path, the work path and the protection path are determined by the controller, a start node of the work path and the protection path is the first apparatus, and an end node of the work path and the protection path is the second apparatus.

For instance, the first apparatus may be a network apparatus. The network apparatus may be a PE. The first apparatus may be a service initiator, and may also be an intermediate node.

For instance, the second apparatus may be a network apparatus. The network apparatus may be a PE. The second apparatus may be a service terminator, and may also be an intermediate node.

Furthermore, the third action bucket includes a first action which is used for instructing the second apparatus to watch whether a failure occurs on the work path, and the fourth action bucket includes a second action which is used for instructing the second apparatus to watch whether a failure occurs on the protection path.

The second apparatus determines that a failure occurs on the work path according to the second action.

Based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

Optionally, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

The second apparatus determines that a failure occurs on the work path according to the first state information.

Based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

Furthermore, the second apparatus transmits the updated protection path flow entry to the controller.

In this embodiment, a second apparatus receives second information transmitted by a controller, where the second information includes a second flow entry and a second group entry. The second flow entry includes a work path flow entry and a protection path flow entry. A match filed of the work path flow entry includes a first tag. An instruction field of the work path flow entry includes a second group action. An operand of the second group action is a second group identifier, and the second group action is used for instructing the second apparatus to associate the work path flow entry with the second group entry. A match field of the protection path flow entry includes a second tag. An instruction field of the protection path flow entry includes a drop action. The second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message. The first message is the same as the third message. The second apparatus determines the third action bucket to be live. A group type of the second group entry is fast failover. The second apparatus drops the fourth message according to the protection path flow entry, pops the first tag in the second message according to the work path flow entry and outputs the first message. In the above described technical solutions, a same message is transmitted to the second apparatus via a plurality of paths, and the second apparatus selects to receive the second message transmitted from the work path. The above described technical solutions help to support a service with higher QoS requirements, such as a banking service or a mobile backhaul service.

FIG. 3 is a schematic flow chart of a method for transmitting information according to Embodiment 3 of the present invention, including:

31: a first apparatus receives first information transmitted by a controller, where the first information includes a first flow entry and a first group entry; where the first flow entry includes a match field and an instruction field, the match filed includes a destination identifier, and the instruction field includes a first group action, an operand of the first group action is a first group identifier, and the first group action is used for instructing the first apparatus to associate the first flow entry with the first group entry; the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, the third message is the same as the first message.

32: the first apparatus transmits the second message to a second apparatus via a work path according to the first information, and transmits the fourth message to the second apparatus via a protection path.

The work path and the protection path are determined by the controller, a start node of the work path and the protection path is the first apparatus, an end node of the work path and the protection path is the second apparatus, the work path corresponds to the first tag, and the protection path corresponds to the second tag.

In this embodiment, first information transmitted by a controller is received by a first apparatus, where the first information includes a first flow entry and a first group entry.

The first flow entry includes a match field and an instruction field. The match filed includes a destination identifier. The instruction field includes a first group action. An operand of the first group action is a first group identifier. The first group action is used for instructing the first apparatus to associate the first flow entry with the first group entry. The first group entry includes a first action bucket and a second action bucket. A group type of the first group entry is ALL. The first action bucket is used for instructing the first apparatus to push a first tag into a first message matching the first flow entry to generate a second message, and the second action bucket is used for instructing the first apparatus to push a second tag into a third message to generate a fourth message. The third message is the same as the first message. The first apparatus transmits the second message to a second apparatus via a work path according to the first information, and transmits the fourth message to the second apparatus via a protection path. In the above described technical solutions, a same message is transmitted via a plurality of paths. The above described technical solutions help to support a service with higher QoS requirements, such as a banking service or a mobile backhaul service.

Figures 5, 6:
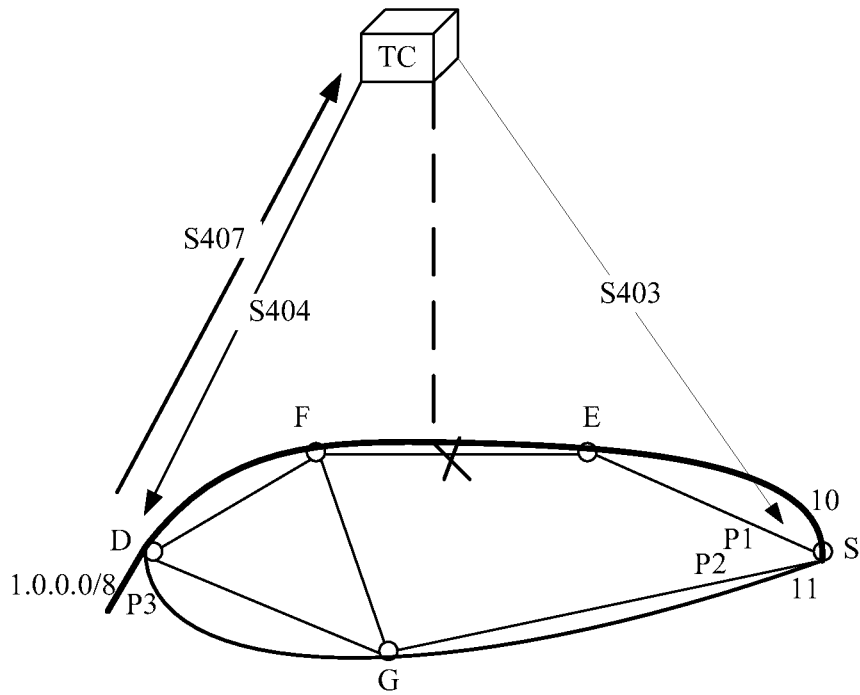
FIG. 5 is a schematic diagram of a method for transmitting information according to Embodiment 4 of the present invention.
FIG. 6 is a schematic diagram of first information in a method for transmitting information according to Embodiment 4 of the present invention.
Figure 7:
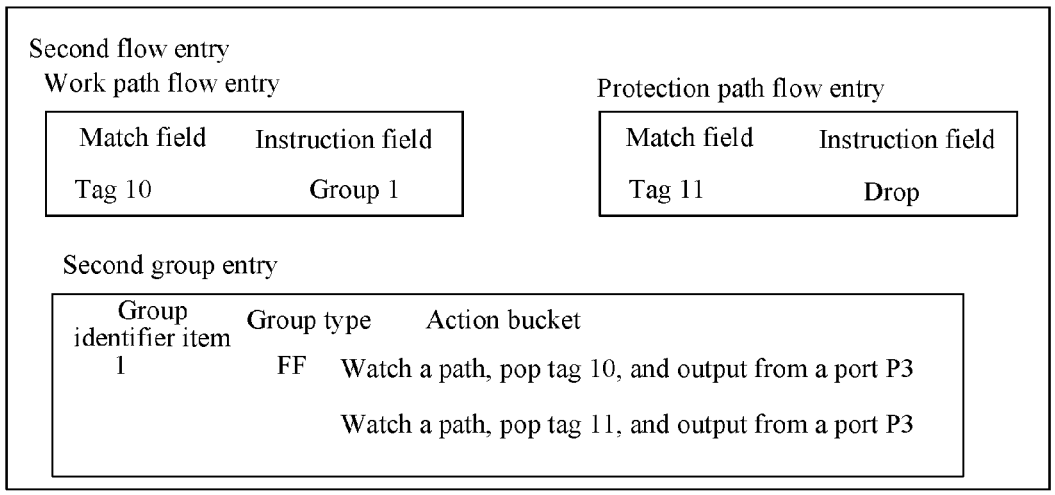
FIG. 7 is a schematic diagram of second information in a method for transmitting information according to Embodiment 4 of the present invention.
Figure 8:
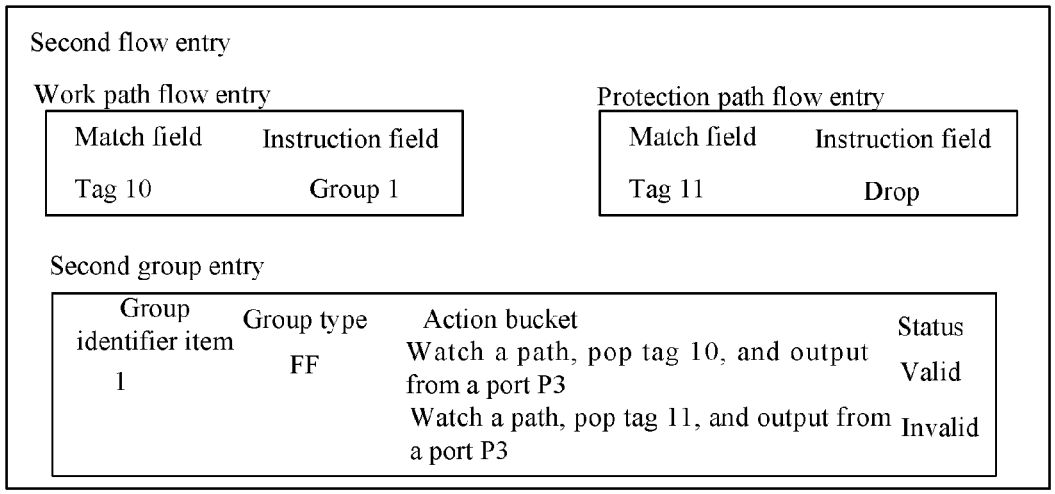
FIG. 8 is a schematic diagram of another second information in a method for transmitting information according to Embodiment 4 of the present invention.
Figure 9:
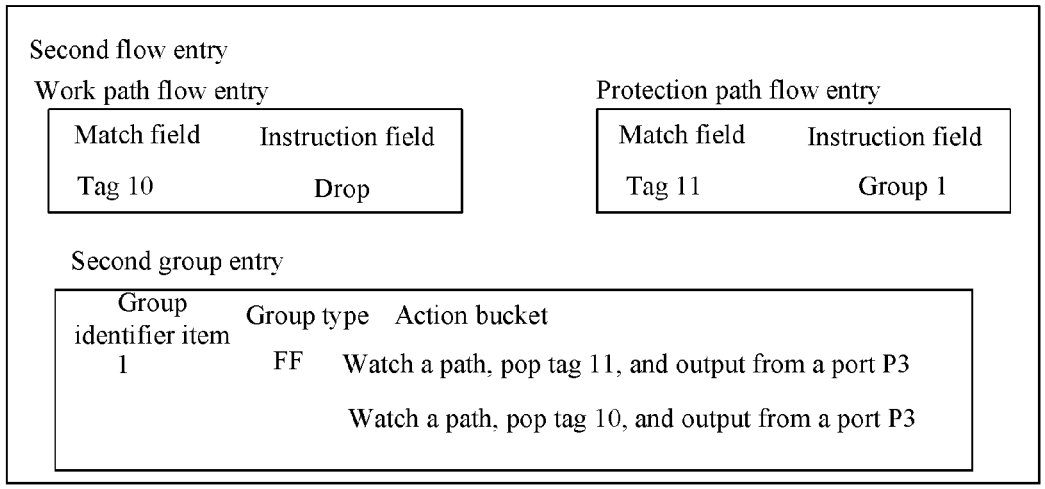
FIG. 9 is a schematic diagram of updated second information in a method for transmitting information according to Embodiment 4 of the present invention.
Figure 10:
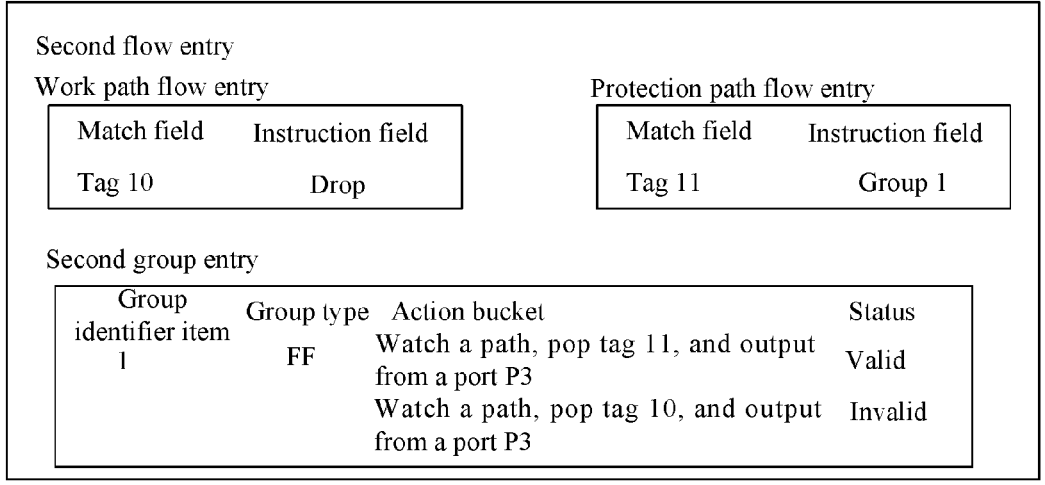
FIG. 10 is a schematic diagram of another updated second information in a method for transmitting information according to Embodiment 4 of the present invention.

FIG. 4 is a signaling flow chart of a method for transmitting information according to Embodiment 4 of the present invention. FIG. 5 is a schematic diagram of a method for transmitting information according to Embodiment 4 of the present invention. FIG. 6 is a schematic diagram of first information in a method for transmitting information according to Embodiment 4 of the present invention. FIG. 7 is a schematic diagram of second information in a method for transmitting information according to Embodiment 4 of the present invention. FIG. 8 is a schematic diagram of another second information in a method for transmitting information according to Embodiment 4 of the present invention. FIG. 9 is a schematic diagram of updated second information in a method for transmitting information according to Embodiment 4 of the present invention. FIG. 10 is a schematic diagram of another updated second information of a method for transmitting information according to Embodiment 4 of the present invention. The method for transmitting information according to Embodiment 4 of the present invention relates to a controller, a first apparatus and a second apparatus. As shown in FIG. 5, a thin client (English: thin client, TC for short) is the controller, S is the first apparatus, D is the second apparatus, E, F and G are intermediate devices, a destination address of a service request is 1.0.0.0/8. As shown in FIG. 4, the method for transmitting information includes:

S401: a first apparatus transmits a service request to a controller.

S402: the controller determines a work path and a protection path according to the service request.

The controller determines one work path and at least one protection path. The number of the protection path may be one or more. A start node of the work path and the protection path is the first apparatus. An end node of the work path and the protection path is a second apparatus. Specifically, the work path corresponds to a first tag, and the protection path corresponds to a second tag. If there are multiple protection paths, then different protection paths correspond to different second tags. A work path and a protection path between S and D determined by the controller are shown in FIG. 5. The work path is S-E-F-D.

The protection path is S-G-D. S is a start node. D is an end node. E, F and G are intermediate nodes.

S403: the controller transmits first information to the first apparatus.

Specifically, the first information is shown in FIG. 6, and the first information includes a first flow entry and a first group entry. The first flow entry includes a match field and an instruction field. The match field includes a destination identifier. The destination identifier may be an IP address of a destination. The IP address of the destination herein is 1.0.0.0/8, which is used for matching a message of which an IP address of a destination is 1.0.0.0/8. An IP address of a destination of a first message matches the match field. An instruction in the instruction field is executed for the first message. The instruction field includes a first group action. An operand of the first group action is a first group identifier. The first group action is used for instructing the first apparatus to associate the first flow entry with the first group entry. The first group entry includes a group identifier item, a group type and action buckets. The action buckets include a first action bucket and a second action bucket. The first action bucket is used for instructing the first apparatus to push the first tag into a first message matching the first flow entry to generate a second message, and transmit the second message to the second apparatus via the work path. The second action bucket is used for instructing the second apparatus to push the second tag into a third message to generate a fourth message, and transmit the fourth message to the second apparatus via the protection path. The third message is the same as the first message. The first message may be copied, and thus the third message is generated. As shown in FIG. 6, the first action bucket in the action bucket instructs to push tag 10 into and output from a port P1. That is, tag 10 is pushed into the first message to generate a second message, and the second message is forwarded via the port P1. tag 10 corresponds to the work path. The first action bucket instructs to transmit the second message to the second apparatus via the work path. The first action bucket may include a Push-Tag (English: Push-Tag) action and an Output (English: Output) action. The push-tag action is used for implementing the pushing of tag 10. The output action is used for implementing the outputting from the port P1. Similarly, the second action bucket instructs to push tag 11 into and output from a port P2. That is, tag 11 is pushed into the third message to generate a fourth message, and the fourth message is forwarded via the port P2. Tag 11 corresponds to the protection path. The second action bucket instructs to transmit the fourth message to the second apparatus via the protection path. The group type is OFGP-T_ALL, which indicates that all action buckets in the action buckets are valid. In this embodiment, the group type indicates that both the first action bucket and the second action bucket are valid.

S404: the control transmits second information to the second apparatus.

The second information includes a second flow entry and a second group entry, specifically, the second flow entry includes a work path flow entry and a protection path flow entry, where both the work path flow entry and the protection path flow entry include a match field and an instruction field, in this embodiment, as shown in FIG. 7, the match filed of the work path flow entry includes tag 10, and the instruction field includes a second group action, an operand of the second group action is a second group identifier, the second group identifier in this embodiment is 1, and the second group action is used for instructing the second apparatus to associate the work path flow entry with the second group entry; the match field of the protection path flow entry includes tag 11, and the instruction field includes a drop action, where the drop action is used for instructing the second apparatus to drop the received fourth message.

The second group entry includes a group identifier item, a group type and action buckets, the action buckets include a third action bucket and a fourth action bucket, as shown in FIG. 5, the second apparatus forwards data out of a port P3. The action buckets in the second group entry may use two manners as follow.

Optionally, Manner 1, as shown in FIG. 7, actions in the third action bucket include: watch path (watch path), pop tag 10 (Pop tag 10), and output from the port P3. Actions in the fourth action bucket include: watch path (watch path), pop tag 11 (Pop tag 11), and output from the port P3. A group type of the second group entry is fast failover (OFGPT_FF). The third action bucket is live, thus only the actions in the third action bucket are performed. When a failure occurs on the work path, then the actions in the fourth action bucket are performed.

Optionally, Manner 2, as shown in FIG. 8, the third action bucket also includes first state information identifying whether a failure occurs on the work path. The first state information is determined by the second apparatus according to the watch path (watch path) action. The first state information is valid. The fourth action bucket also includes second state information identifying whether a failure occurs on the protection path. The second state information is determined by the second apparatus according to the watch path action. The second state information is invalid.

S405: the second apparatus detects whether a failure occurs on the work path.

There may be two manners to detect whether the work path or a failure occurs on the protection path through watching path (watch path). Manner 1: after calculating the work path and the protection path for the first apparatus and the second apparatus and issuing the first information and the second information, the controller initiates protocols such as BFD and OAM for the second apparatus and the first apparatus to watch whether a failure occurs on the path. Manner 2: the controller transmits a message to the first apparatus, which is then transmitted by the first apparatus to the second apparatus via the work path, and deems that a failure occurs on the work path if the second apparatus fails to receive the message. As shown in FIG. 5, a failure occurs on the link EF, the second apparatus may know whether a failure occurs on the work path according to the above two manners.

S406: if a work path link is normal, then use the original first information and the original second information for message transmission and reception, if a failure occurs on the work path, and then modify the second information.

Specifically, when it is detected that a failure occurs on the work path, if the action bucket described in Manner 1 of S404 is used, then the instruction field of the work path flow entry of the second information is updated as Drop, and the instruction field of the protection path flow entry is updated as a second group action, an operand of the second group action is a second group identifier 1, as shown in FIG. 9; if the action bucket described in Manner 2 of S404 is used, and then the first state information in the third action bucket in the second group entry of the second information is updated from valid to invalid, and the second state information in the fourth action bucket is updated from invalid to valid, according to the state information in the action buckets, the instruction field of the work path flow entry of the work path corresponding to the third action bucket is updated as Drop, and the instruction field of the protection path flow entry of the protection path corresponding to the third action bucket is updated as a second group action, an operand of the second group action is a second group identifier 1, as shown in FIG. 10. Thus, the second apparatus is enabled to receive a message from the protection path, and a purpose of fast protection switching is achieved.

S407: the second apparatus transmits the updated second information to the controller.

The second information is the second flow entry and the second group entry of the second apparatus.

In this embodiment, a first apparatus transmits a service request to a controller. The controller determines a work path and a protection path according to the service request. A start node of the work path and the protection path is the first apparatus, and an end node is a second apparatus. The controller transmits first information to the first apparatus, and transmits second information to the second apparatus, thus end-to-end service communications have a multi-transmission and selective reception function. Furthermore, the second apparatus detects whether a failure occurs on the work path. If the work path link is normal, then use the original second information for message reception, if a failure occurs on the work path, then modify the second information. The second apparatus transmits the updated second information to the controller. The above technical solutions implement a multi-transmission and selective reception fast routing protection characteristic under the OpenFlow controlled data network, when a failure occurs on the work path, the second apparatus receives a message from a valid protection path, thus a purpose of fast protection switching is achieved, impacts from the failure on continuity and reliability of service transmission are reduced, and quality of the service transmission is effectively improved.

Figure 11:
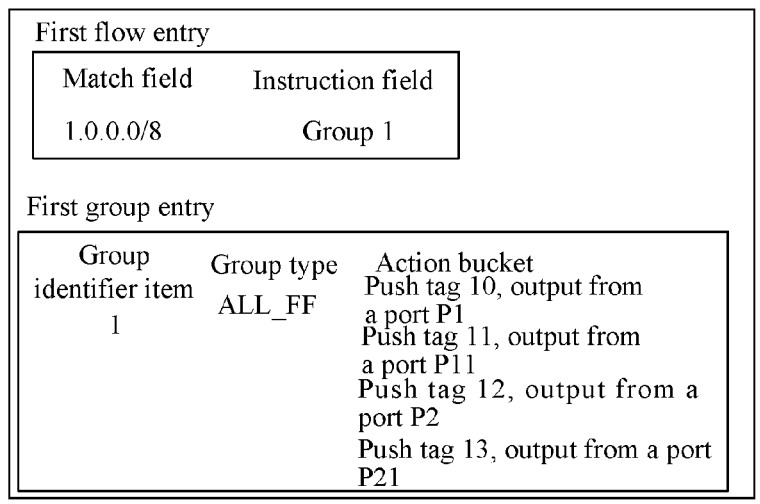
FIG. 11 is a schematic diagram of first information in a method for transmitting information according to Embodiment 5 of the present invention.
Figure 12:
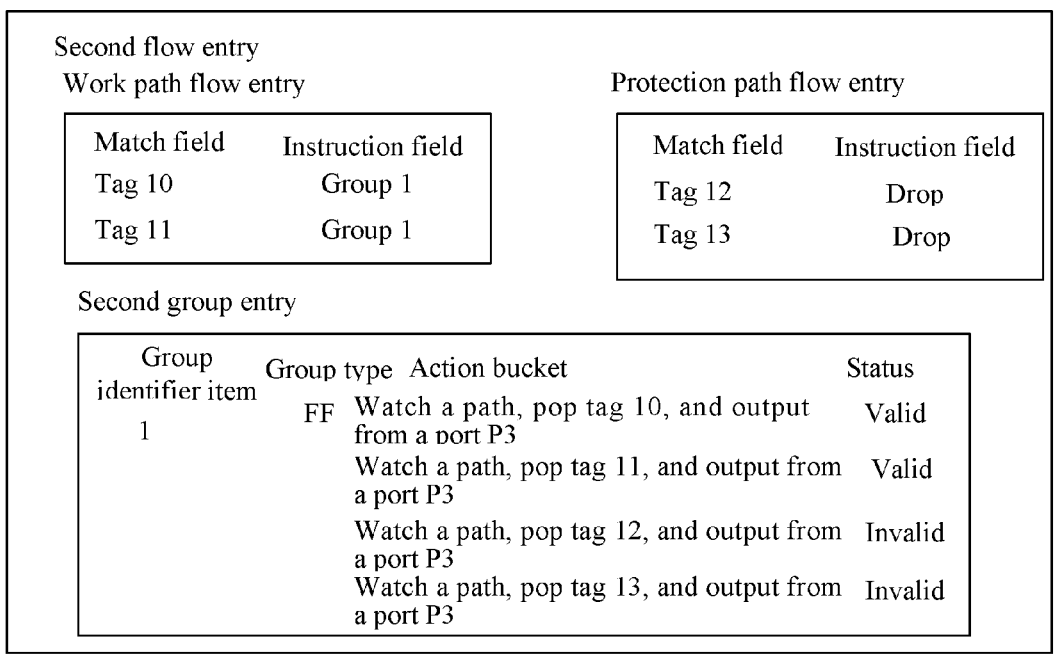
FIG. 12 is a schematic diagram of second information in a method for transmitting information according to Embodiment 5 of the present invention.
Figure 13:
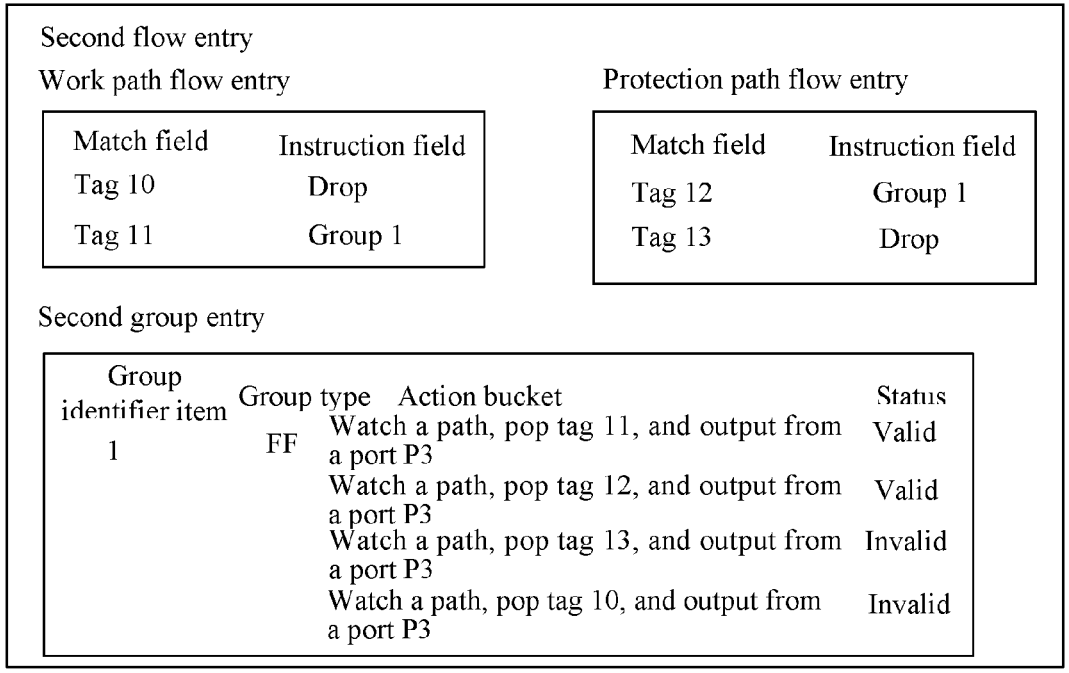
FIG. 13 is a schematic diagram of updated second information in a method for transmitting information according to Embodiment 5 of the present invention.

In Embodiment 4, the multi-transmission and selective reception fast routed protection characteristic under the OpenFlow controlled data network is implemented by means of one work path and multiple protection paths, but this embodiment is not limited thereto, as for another possible implementation, where a plurality of work paths may be selected and a plurality of protection paths are selected, Embodiment 5 is described by taking two work paths and two protection paths as an example, which differs from Embodiment 4 in that, in the first group entry of the first information, a group type is OFGPT_ALL-FF, and the group type indicates that two valid work paths in the action buckets are live, that is, after the controller establishes two work paths and two protection paths for the first apparatus and the second apparatus, the first apparatus transmits a same message via the two work paths only, and the protection paths do not transmit messages temporarily. The second apparatus only receives a message transmitted on one work path. When a failure occurs on one work path, then the second apparatus receives the message via the other valid work path firstly, and one protection path is validated as a valid path, and then the first apparatus transmits the same message via the valid work path and protection path simultaneously. FIG. 11 is a schematic diagram of first information in a method for transmitting information according to Embodiment 5 of the present invention; FIG. 12 is a schematic diagram of second information in a method for transmitting information according to Embodiment 5 of the present invention; FIG. 13 is a schematic diagram of updated second information in a method for transmitting information according to Embodiment 5 of the present invention. As shown in FIG. 11, the controller transmits first information as shown in FIG. 11 to the first apparatus, the first information includes a first flow entry and a first group entry, an instruction field in the first flow entry includes a first group action, an operand of the first group action is Group 1, which is used for being associated to the corresponding first group entry, a group type of the first group entry is OFGP-T_ALL_FF, which is used for indicating that two work path tags 10 and tag 11 in the action buckets are live, and indicating transmitting messages via the port P1 and the port P11 respectively. The controller transmits second information as shown in FIG. 12 to the second apparatus, the second information as shown in FIG. 12 includes a second flow entry and a second group entry, where the second flow entry includes a work path flow entry and a protection path flow entry, instruction fields of two work paths 10, 11 in the work path flow entry include second group actions, an operand of the second group actions is Group 1, which is used for being associated to the corresponding second group entry, action instructions of two protection paths 12, 13 in the protection path flow entry are Drop, a group type of the second group entry is OFGPT_FF, which is used indicating only receiving message transmitted from one protection path. When a failure occurs on the work path 10, in order to achieve fast protection switching, then the second apparatus receives a message from the valid work path 11, furthermore, as shown in FIG. 13, path tags 11, 12 are set to be valid, and path tags 10, 13 are set to be invalid, an action instruction corresponding to the tag 10 in the second flow entry is modified to Drop according to the corresponding second group entry, an action instruction corresponding to the tag 12 is modified to Group 1, then the first apparatus transmits messages via the work path 11 and the protection path 12, and the second apparatus only receives a message transmitted from one valid path.

Figure 14:
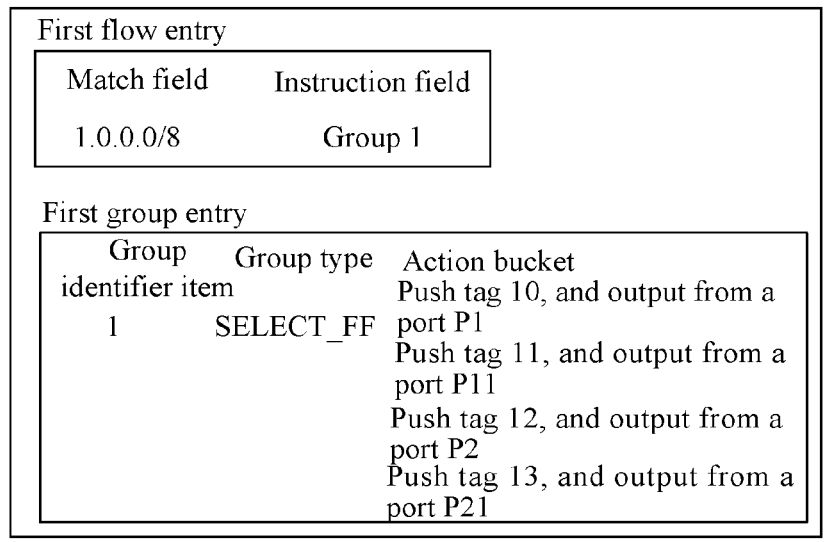
FIG. 14 is a schematic diagram of first information in a method for transmitting information according to Embodiment 6 of the present invention.
Figure 15:
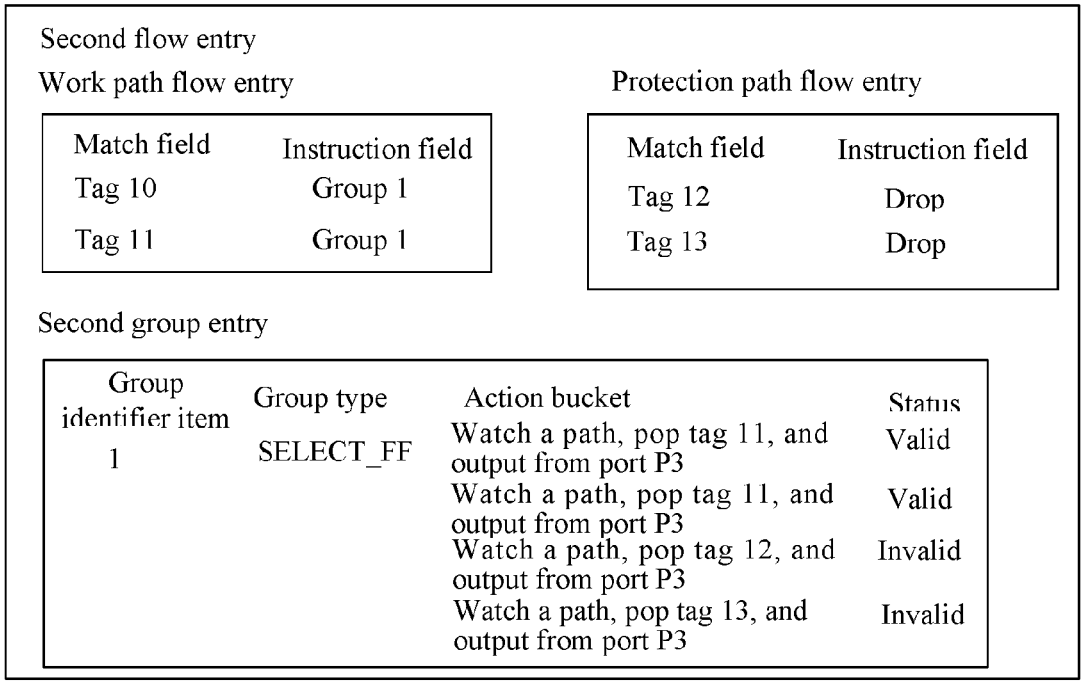
FIG. 15 is a schematic diagram of second information in a method for transmitting information according to Embodiment 6 of the present invention.
Figure 16:
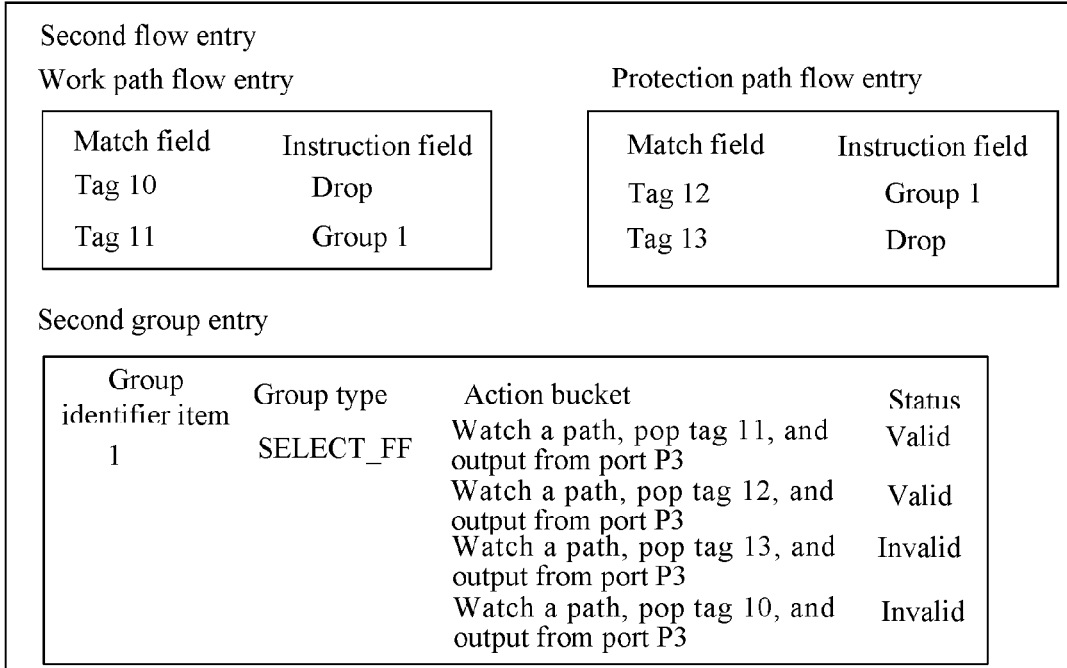
FIG. 16 is a schematic diagram of updated second information in a method for transmitting information according to Embodiment 6 of the present invention.

In the above embodiments, a same message is transmitted via one work path and a plurality of protection paths, or a same message is transmitted via a plurality of work paths, and thus a purpose of multi-transmission is achieved. This embodiment is not limited thereto, as for another possible implementation, in Embodiment 6, a plurality of work paths and a plurality of protection paths are selected, transmission of messages using the work paths may be implemented by means of load sharing, that is, different messages in a service are transmitted via different work paths. Difference from an implementing process of Embodiment 4 lies in that, in the first group entry of the first information, a group type is OFGPT_SELECT_FF, the group type indicates that work paths transmitting different messages are selected to be valid, other paths are invalid. FIG. 14 is a schematic diagram of first information in a method for transmitting information according to Embodiment 6 of the present invention; FIG. 15 is a schematic diagram of second information in a method for transmitting information according to Embodiment 6 of the present invention; FIG. 16 is a schematic diagram of updated second information in a method for transmitting information according to Embodiment 6 of the present invention. As shown in FIG. 14, the controller transmits first information as shown in FIG. 14 to the first apparatus, a group type in the first group entry of the first information is SELECT_FF, which is used for indicating that different messages in a service are transmitted via ports P1, P11 of two work paths 10, 11 respectively, and two protection paths 12, 13 do not transmit messages temporarily. The controller transmits second information as shown in FIG. 15 to the second apparatus, the second flow entry includes a work path flow entry and a protection path flow entry, operands of group actions of instruction fields of the work paths 10, 11 in the work path flow entry are Group 1, which is used for being associated to the corresponding second group entry, action instructions of the protection paths 12, 13 in the protection path flow entry are Drop. In the second group entry, a group type is OFGPT_SELECT_FF, which is used for indicating that both of the two work paths are live, and a message is forwarded via the corresponding port P3, and the second apparatus receives messages from all valid protection paths. When a failure occurs on the work path 10, then the first apparatus firstly uses the work path 11 to transmit a different message to achieve fast protection switching, furthermore, the protection path 12 is set to be valid, the first apparatus transmits different messages via the protection path 12 and the work path 11, according to state information in the second group entry, an operand of the group action of the instruction field of the path 12 in the corresponding second flow entry is modified to Group 1, the instruction field of the path 10 is modified to Drop, thereby restoring initial load sharing status, the first apparatus transmits different messages via the paths 11, 12, and the second apparatus receives messages transmitted from all valid paths.

FIG. 17 is a schematic flow chart of a method for transmitting information according to Embodiment 7 of the present invention, including:

91: a controller determines a work path and a protection path, where a start node of the work path and the protection path is a first apparatus, an end node of the work path and the protection path is a second apparatus, the work path corresponds to a first tag, and the protection path corresponds to a second tag.

92: the controller transmits first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message.

93: the controller transmits second information to the second apparatus, where the second information includes a second flow entry; the second flow entry includes a work path flow entry and a protection path flow entry; where a match filed of the work path flow entry includes the first tag, and an instruction field of the work path flow entry is used for instructing the second apparatus to pop the first tag of the second message and output the first message; a match field of the protection path flow entry includes the second tag, and an instruction field of the protection path flow entry includes a drop action, where the drop action is used for instructing the second apparatus to drop the fourth message.

For instance, the first apparatus may be a network apparatus. The network apparatus may be a PE. The first apparatus may be a service initiator, and may also be an intermediate node.

For instance, the second apparatus may be a network apparatus. The network apparatus may be a PE. The second apparatus may be a service terminator, and may also be an intermediate node.

Furthermore, after receiving a notification message indicating that a failure occurs on the work path, the controller transmits a flow table updating message to the second apparatus, where the flow table updating message is used for instructing the second apparatus to update the protection path flow entry as a new protection path flow entry; a match field of the new protection path flow entry includes the second tag, and an instruction field of the new protection path flow entry is used for instructing the second apparatus to pop the second tag in a sixth message and output a fifth message, where the sixth message is generated by the first apparatus through pushing the second tag into the fifth message.

The flow table updating message is further configured to instruct the second apparatus to update the work path flow entry as a new work path flow entry; a match field of the new work path flow entry includes the first tag, and an instruction field of the new work path flow entry is used for instructing the second apparatus to drop an eighth message, where the eighth message is generated by the first apparatus through pushing the first tag into a seventh message.

In this embodiment, a controller determines one work path and at least one protection path. A start node of the work path and the protection path is a second apparatus. The work path corresponds to a first tag, and the protection path corresponds to a second tag. The controller transmits first information to the first apparatus to enable the first apparatus to transmit messages having same contents to different paths according to the first information. The above described technical solution achieves that messages having same contents are transmitted via different paths, and thus a purpose of multi-transmission is achieved. The controller transmits second information to the second apparatus to enable the second apparatus to select to receive a message forwarded via a valid path according to the second information, and the above described technical solution achieves a selective reception. The technical solutions provided in this embodiment help to support a service with higher QoS requirements. The service placing higher requirements upon QoS may be a banking service or a mobile backhaul service.

Figure 18:
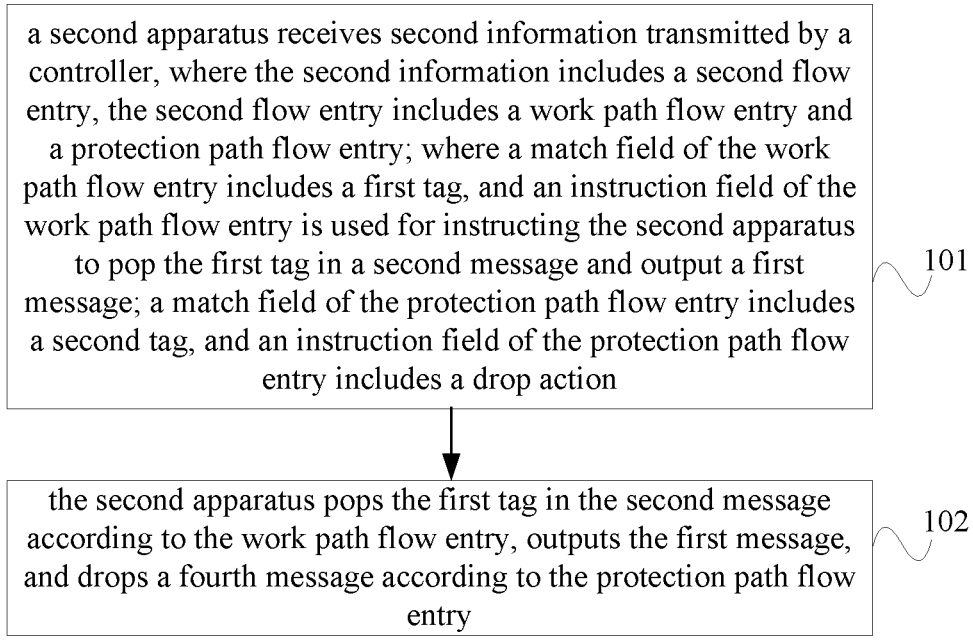
FIG. 18 is a schematic flow chart of a method for transmitting information according to Embodiment 8 of the present invention.

FIG. 18 is a schematic flow chart of a method for transmitting information according to embodiment 8 of the present invention, including:

101: a second apparatus receives second information transmitted by a controller, where the second information includes a second flow entry, the second flow entry includes a work path flow entry and a protection path flow entry; where a match field of the work path flow entry includes a first tag, and an instruction field of the work path flow entry is used for instructing the second apparatus to pop the first tag in a second message and output a first message; a match field of the protection path flow entry includes a second tag, and an instruction field of the protection path flow entry includes a drop action.

102: the second apparatus pops the first tag in the second message according to the work path flow entry, outputs the first message, and drops a fourth message according to the protection path flow entry.

The work path and the protection path are determined by the controller, a first apparatus is a start node of the work path and the protection path, the second apparatus is an end node of the work path and the protection path, the first tag is a tag corresponding to the work path, and the second tag is a tag corresponding to the protection path.

For instance, the first apparatus may be a network apparatus. The network apparatus may be a PE. The first apparatus may be a service initiator, and may also be an intermediate node.

For instance, the second apparatus may be a network apparatus. The network apparatus may be a PE. The second apparatus may be a service terminator, and may also be an intermediate node.

Furthermore, the second apparatus receives a flow table updating message transmitted by the controller, where the flow table updating message is used for instructing the second apparatus to update the protection path flow entry as a new protection path flow entry, and the flow table updating message is generated by the controller based on a notification message indicating that a failure occurs on the work path as received by the controller; a match field of the new protection path flow entry includes the second tag, the new protection path flow entry is used for instructing the second apparatus to pop the second tag in a sixth message and output a fifth message, the sixth message is generated by the first apparatus through pushing the second tag into the fifth message, and the sixth message is transmitted by the first apparatus to the second apparatus via the protection path.

Furthermore, the flow table updating message is further configured to instruct the second apparatus to update the work path flow entry as a new work path flow entry; a match field of the new work path flow entry includes the first tag, the new work path flow entry is used for instructing the second apparatus to drop an eighth message, where the eighth message is generated by the first apparatus through pushing the first tag into a seventh message, and the eighth message is transmitted by the first apparatus to the second apparatus via the work path.

In this embodiment, a second apparatus receives second information transmitted by a controller, where the second information includes a second flow entry, the second flow entry includes a work path flow entry and a protection path flow entry, the second apparatus pops a first tag in a second message according to the work path flow entry, outputs a first message, and drop a fourth message according to the protection path flow entry, so that when messages having same contents are transmitted to the second apparatus via a plurality of paths, the second apparatus selects to receive a message transmitted via a work path. The described technical solutions help to support a service with higher QoS requirements, such as a banking service or a mobile backhaul service.

Figure 19:
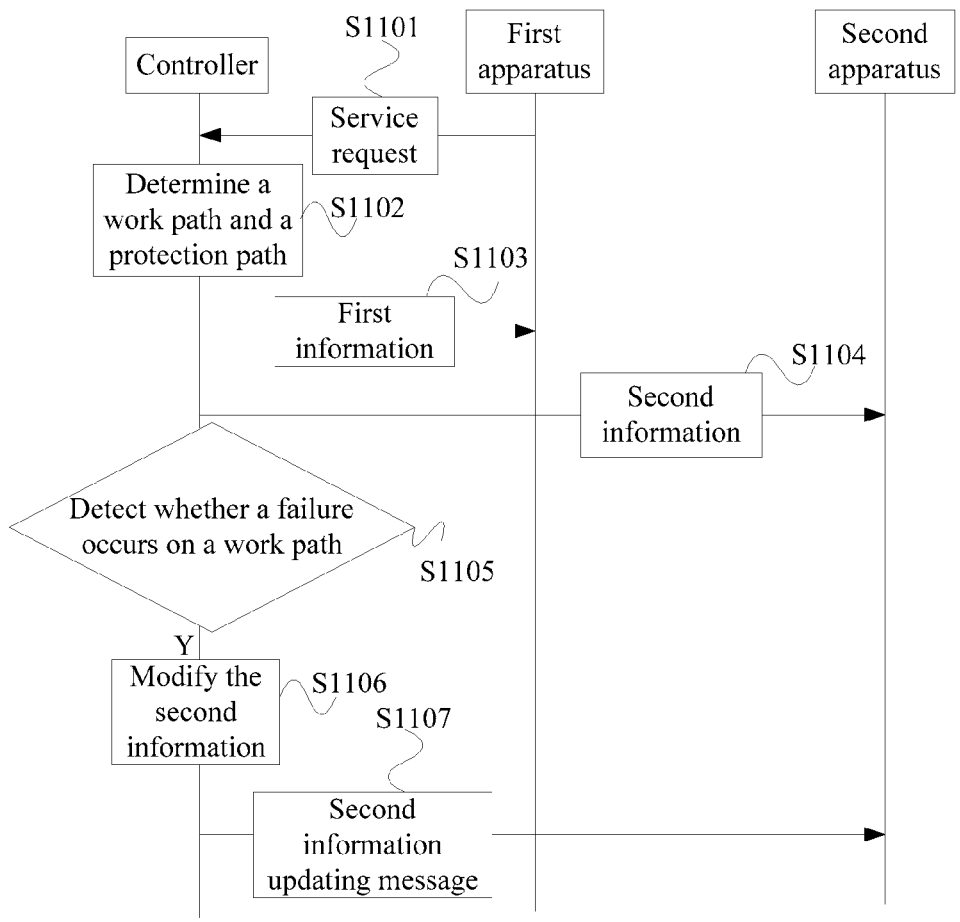
FIG. 19 is a signaling flow chart of a method for transmitting information according to Embodiment 9 of the present invention.
Figure 20:
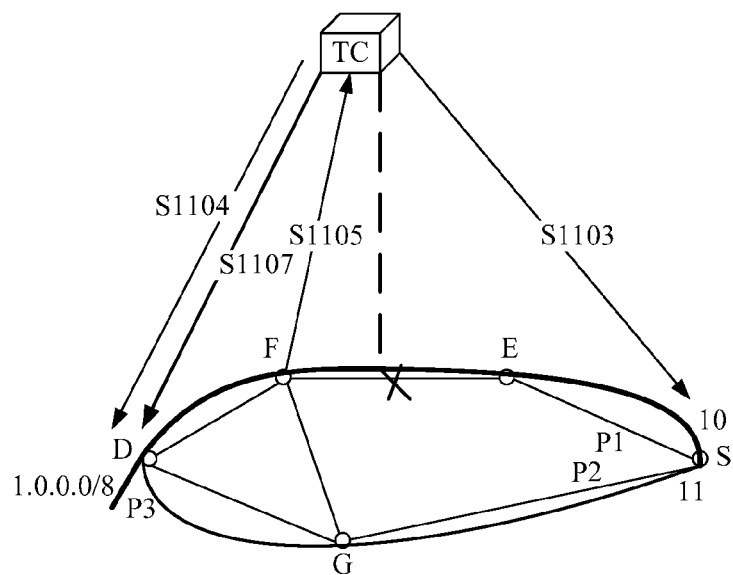
FIG. 20 is a schematic diagram of a method for transmitting information according to Embodiment 9 of the present invention.
Figure 21:
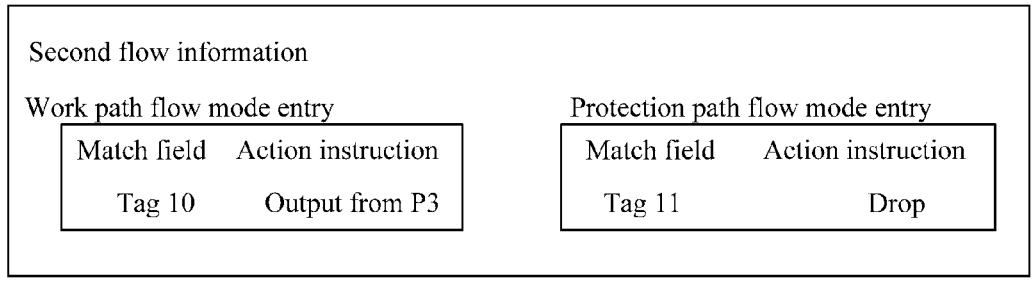
FIG. 21 is a schematic diagram of second information in a method for transmitting information according to Embodiment 9 of the present invention.
Figure 22:
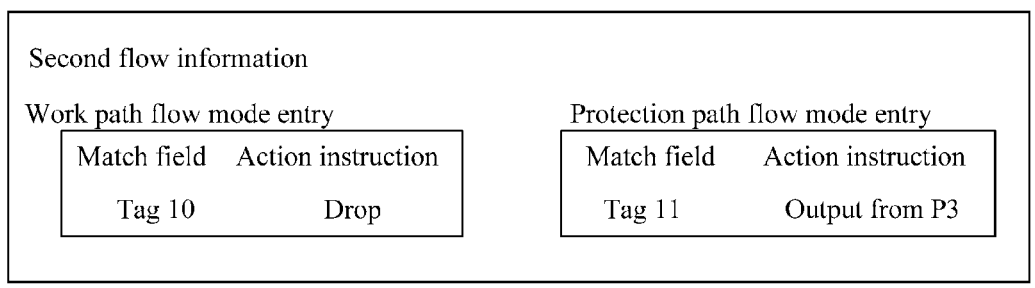
FIG. 22 is a schematic diagram of updated second information in a method for transmitting information according to Embodiment 9 of the present invention.

FIG. 19 is a signaling flow chart of a method for transmitting information according to Embodiment 9 of the present invention; FIG. 20 is a schematic diagram of a method for transmitting information according to Embodiment 9 of the present invention, as shown in FIG. 20, S is a first apparatus, D is a second apparatus, E, F and G are intermediate nodes, and TC is a controller, FIG. 21 is a schematic diagram of second information of a method for transmitting information according to Embodiment 9 of the present invention; FIG. 22 is a schematic diagram of updated second information of a method for transmitting information according to Embodiment 9 of the present invention; embodiments of the present invention differ from embodiment 4 in that, second information transmitted by the controller to the second apparatus is different, moreover, when a failure occurs on a work path, the controller updates the second information and transmits the same to the second apparatus, this method embodiment includes:

S1101: a first apparatus transmits a service request to a controller.

S1102: the controller determines a work path and a protection path according to the service request.

S1103: the controller transmits first information to the first apparatus.

S1101~S1103 are the same as S401~S403 in Embodiment 4, thus detailed contents will not be repeated herein.

S1104: the controller transmits second information to the second apparatus.

The second information includes a second flow entry, specifically, the second flow entry includes a work path flow entry and a protection path flow entry, where the work path flow entry includes a match field and an instruction field, the match field includes a first tag, and the protection path flow entry includes a match field and an instruction field, where the match field includes a second tag, as shown in FIG. 20, the first tag is 10, and the second tag is 11; then the match field in the work path flow entry in FIG. 21 includes: tag 10, and the instruction field includes an output port P3, which is used for instructing the second apparatus to pop the first tag in a second message and output a first message via the port P3; the match field in the protection path flow entry includes tag 11, and the instruction field includes Drop, which is used for instructing the second apparatus to drop a fourth message received via the protection path, thereby achieving a purpose of selective reception.

S1105: the controller detects whether a failure occurs on the work path.

Specifically, when a device corresponding to the work path finds a link failure, it reports link failure information to the controller, and the controller analyzes the failure information. As shown in FIG. 20, a failure occurs on a link EF, then an intermediate equipment F transmits the failure information to TC.

S1106: if a work path link is normal, then the second apparatus uses the original second information for message transmission and reception, if a failure occurs on the work path, then the controller modifies the second information.

Specifically, when it is detected that a failure occurs on the work path, then the instruction field in the protection path flow entry of the second information is updated to an output port P3, which is used for instructing the second apparatus to pop the second tag in a sixth message and output a fifth message via the port P3, the fifth message and the third message have same properties; the instruction field in the work path flow entry is updated to Drop, which is used for instructing the second apparatus to drop an eighth message received via the work path, where the eighth message is generated by the first apparatus through pushing the first tag into a seventh message, and the seventh message and the first message have same properties, as shown in FIG. 22. Thus, when a failure occurs on the work path, the second apparatus receives from the protection path a message transmitted by the first apparatus, thereby achieving a purpose of fast protection switching.

S1107: the controller transmits the updated second flow table information to the second apparatus.

The updated second information is a protection path flow entry and a work path flow entry updated by the controller. The second apparatus receives a message transmitted by the first apparatus according to the updated second information.

In this embodiment, a first apparatus initiates a service request, and a controller determines a work path and a protection path according to the service request, where the work path and the protection path have the same first apparatus and second apparatus that the service request aims to reach, the controller transmits first information to the first apparatus, and transmits second information to the second apparatus, thus end-to-end service communications have a multi-transmission and selective reception function, furthermore, the controller detects whether a failure occurs on the work path, if a wok path link is normal, then the second apparatus uses the original second information for message reception, if a failure occurs on the work path, then the controller modifies the second information, the controller transmits the updated second information to the second apparatus, and the second apparatus performs message reception according to the updated second information. The above technical solutions implement a multi-transmission and selective reception fast routed protection characteristic under the OpenFlow controlled data network, when a failure occurs on the work path, the second apparatus receives a message from a valid protection path, thus a purpose of fast protection switching is achieved, impacts from the failure upon continuity and reliability of service transmission are reduced, and quality of the service transmission is effectively improved, which helps to support a service with higher QoS requirements.

Figure 23:
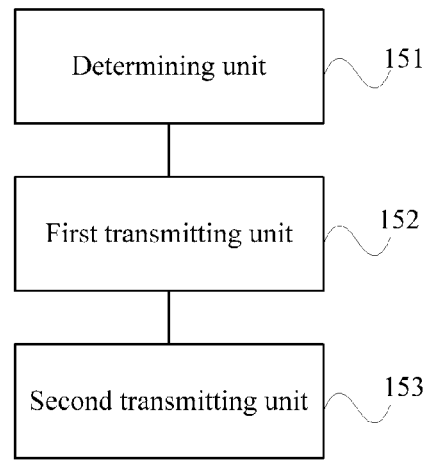
FIG. 23 is a schematic structural diagram of a controller according to an embodiment of the present invention.

FIG. 23 is a schematic structural diagram of a controller according to an embodiment of the present invention. The controller may be used for implementing a method as shown in FIG. 1. As shown in FIG. 23, the controller in this embodiment includes a determining unit 151, a first transmitting unit 152 and a second transmitting unit 153. The determining unit 151 is configured to determine a work path and a protection path, where a start node of the work path and the protection path is a first apparatus, an end node of the work path and the protection path is a second apparatus, the work path corresponds to a first tag, and the protection path corresponds to a second tag; the first transmitting unit 152 is configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and the second transmitting unit 153 is configured to transmit second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined by the second apparatus to be live, and a group type of the second group entry is fast failover.

For instance, the third action bucket may include a Pop-Tag action and an Output action. The Pop-Tag action is used for implementing the popping of the second tag in the fourth message. The Output action is used for outputting the third message.

Furthermore, the third action bucket includes a first action which is used for instructing the second apparatus to watch whether a failure occurs on the work path, and the fourth action bucket includes a second action which is used for instructing the second apparatus to watch whether a failure occurs on the protection path.

Optionally, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

Furthermore, the controller provided in this embodiment also includes a receiving unit 154, which is configured to receive the updated protection path flow entry transmitted by the second apparatus.

A controller provided in this embodiment determines a work path and a protection path between a first apparatus and a second apparatus according to the first apparatus, transmits first information to the first apparatus to enable the first apparatus to transmit messages having same contents via different paths according to the first information, and transmits second information to the second apparatus to enable the second apparatus to receive a message forwarded from a valid path according to the second information, thereby achieving that messages having same contents are transmitted via different paths and a message transmitted from a valid path is selected to be received, thus helping to support a service with higher QoS requirements. The service placing higher requirements upon QoS may be a banking service or a mobile backhaul service.

Figure 24:
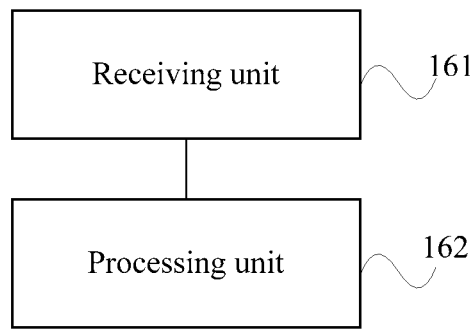
FIG. 24 is a schematic structural diagram of a second apparatus according to an embodiment of the present invention.

FIG. 24 is a schematic structural diagram of a second apparatus according to an embodiment of the present invention. The second apparatus may be used for executing a method as shown in FIG. 2. As shown in FIG. 24, the second apparatus in this embodiment includes a receiving unit 161 and a processing unit 162. The receiving unit 161 is configured to receive second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover; and the processing unit 162 is configured to drop the fourth message according to the protection path flow entry, pop the first tag in the second message according to the work path flow entry and output the first message.

The second message is generated by a first apparatus through pushing the first tag into the first message, the fourth message is generated by the first apparatus through pushing the second tag into the third message, the third message is the same as the first message, the first tag corresponds to the work path, the second tag corresponds to the protection path, the work path and the protection path are determined by the controller, a start node of the work path and the protection path is the first apparatus, and an end node of the work path and the protection path is the second apparatus.

For instance, the first apparatus may be a network apparatus. The network apparatus may be a PE. The first apparatus may be a service initiator, and may also be an intermediate node.

For instance, the second apparatus may be a network apparatus. The network apparatus may be a PE. The second apparatus may be a service terminator, and may also be an intermediate node.

Furthermore, in the second information received by the second apparatus, the third action bucket includes a first action which is used for instructing the second apparatus to watch whether a failure occurs on the work path, and the fourth action bucket includes a second action which is used for instructing the second apparatus to watch whether a failure occurs on the protection path.

Furthermore, the second apparatus also includes a first updating unit 163, which is configured to determine that a failure occurs on the work path according to the second action; based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

In the second information received by the second apparatus, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

Optionally, the second apparatus may also include a second updating unit 164, which is configured to determine that a failure occurs on the work path according to the first state information.

Based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

Furthermore, the second apparatus also includes a transmitting module 165, which is configured to transmit the updated protection path flow entry to the controller.

In this embodiment, a second apparatus receives second information transmitted by a controller, where the second information includes a second flow entry and a second group entry. The second flow entry includes a work path flow entry and a protection path flow entry. A match filed of the work path flow entry includes a first tag, and an instruction field of the work path flow entry includes a second group action. An operand of the second group action is a second group identifier, and the second group action is used for instructing the second apparatus to associate the work path flow entry with the second group entry. A match field of the protection path flow entry includes a second tag, and an instruction field of the protection path flow entry includes a drop action, which is used for instructing the second apparatus to drop a received message which is transmitted via the protection path. The second group entry includes a third action bucket and a fourth action bucket, where the third action bucket is used for instructing the second apparatus to pop the first tag in a second message and output a first message. The fourth action bucket is used for instructing the second apparatus to pop the second tag in a fourth message and output a third message. The second apparatus determines the third action bucket to be live. A group type of the second group entry is fast failover. In the above described technical solutions, messages having same contents are transmitted to the second apparatus via a plurality of paths, and the second apparatus selects to receive a message transmitted from the work path. The above described technical solutions help to support a multi-transmission and selective reception function under the OpenFlow mechanism, and help to better support a service with higher QoS requirements.

Figure 25:
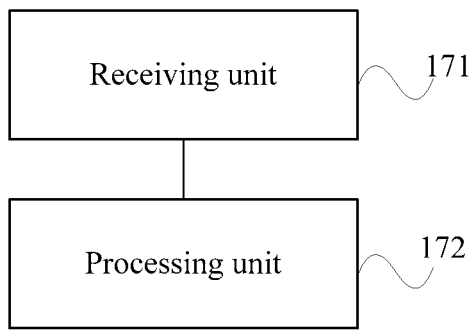
FIG. 25 is a schematic structural diagram of a first apparatus according to an embodiment of the present invention.

FIG. 25 is a schematic structural diagram of a first apparatus according to an embodiment of the present invention. The first apparatus may be used to implement a method as shown in FIG. 3. As shown in FIG. 25, the first apparatus in this embodiment includes a receiving unit 171 and a processing unit 172. The receiving unit 171 is configured to receive first information transmitted by a controller, where the first information includes a first flow entry and a first group entry; where the first flow entry includes a match filed and an instruction field, the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, the third message is the same as the first message; and the processing unit 172 is configured to transmit the second message to a second apparatus via a work path according to the first information, and transmit the fourth message to the second apparatus via a protection path; where the work path and the protection path are determined by the controller, a start node of the work path and the protection path is the first apparatus, an end node of the work path and the protection path is the second apparatus, the work path corresponds to the first tag, and the protection path corresponds to the second tag.

For instance, the first apparatus may be a network apparatus. The network apparatus may be a PE. The first apparatus may be a service initiator, and may also be an intermediate node.

For instance, the second apparatus may be a network apparatus. The network apparatus may be a PE. The second apparatus may be a service terminator, and may also be an intermediate node.

In this embodiment, a first apparatus receives first information transmitted by a controller, and transmits a first message and a third message having same contents to a second apparatus via a work path and a protection path respectively, thus a multi-transmission function is achieved under the OpenFlow mechanism, which enables messages having same contents to be transmitted via a plurality of paths, thereby ensuring that the messages reach a service destination end.

Figure 26:
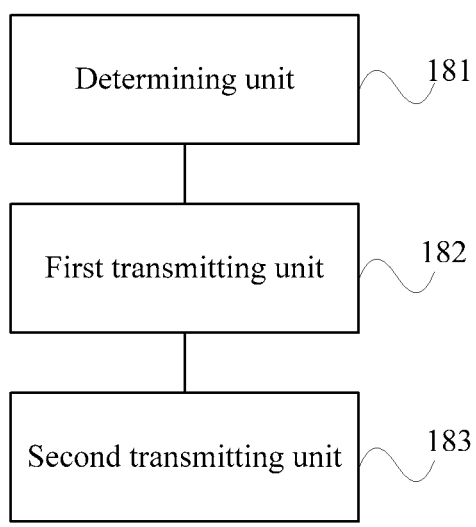
FIG. 26 is a schematic structural diagram of another controller according to an embodiment of the present invention.

FIG. 26 is a schematic structural diagram of another controller according to an embodiment of the present invention. The controller may be used for executing a method as shown in FIG. 17. As shown in FIG. 26, the controller in this embodiment includes a determining unit 181, a first transmitting unit 182 and a second transmitting unit 183. The determining unit 181 is configured to determine a work path and a protection path, where a start node of the work path and the protection path is a first apparatus, an end node of the work path and the protection path is a second apparatus, the work path corresponds to a first tag, and the protection path corresponds to a second tag; the first transmitting unit 182 is configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; the second transmitting unit 183 is configured to transmit second information to the second apparatus, where the second information includes a second flow entry; the second flow entry includes a work path flow entry and a protection path flow entry; where a match filed of the work path flow entry includes the first tag, and an instruction field of the work path flow entry is used for instructing the second apparatus to pop the first tag of the second message and output the first message; a match field of the protection path flow entry includes the second tag, and the instruction field of the protection path flow entry includes a drop action, where the drop action is used for instructing the second apparatus to drop the fourth message.

Furthermore, the controller may also include a third transmitting unit 184, which is configured to: after receiving a notification message indicating that a failure occurs on the work path, transmit a flow table updating message to the second apparatus, where the flow table updating message is used for instructing the second apparatus to update the protection path flow entry as a new protection path flow entry; a match field of the new protection path flow entry includes the second tag, and an instruction field of the new protection path flow entry is used for instructing the second apparatus to pop the second tag in a sixth message and output a fifth message, where the sixth message is generated by the first apparatus through pushing the second tag into the fifth message.

The flow table updating message transmitted by the third transmitting unit is further configured to instruct the second apparatus to update the work path flow entry as a new work path flow entry; a match field of the new work path flow entry includes the first tag, and an instruction field of the new work path flow entry is used for instructing the second apparatus to drop an eighth message, where the eighth message is generated by the first apparatus through pushing the first tag into a seventh message.

In this embodiment, a controller determines one work path and at least one protection path. A start node of the work path and the protection path is a first apparatus, and an end node of the work path and the protection path is a second apparatus. The controller transmits first information to the first apparatus to enable the first apparatus to transmit messages having same contents via different paths according to the first information, and thus a purpose of multi-transmission is achieved. The controller transmits second information to the second apparatus to enable the second apparatus to select to receive a message forwarded via a valid path according to the second information, and thus a selective reception is achieved. This embodiment achieves a multi-transmission and selective reception function under the OpenFlow mechanism, which helps to better support a service with higher QoS requirements.

Figure 27:
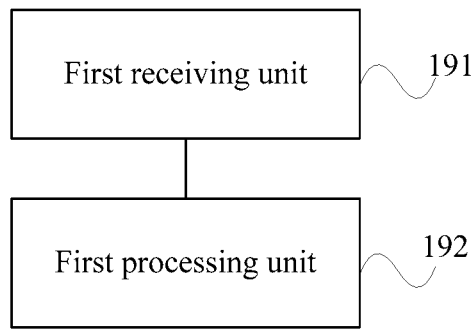
FIG. 27 is a schematic structural diagram of another second apparatus according to an embodiment of the present invention.

FIG. 27 is a schematic structural diagram of another second apparatus according to an embodiment of the present invention. The second apparatus may be used for executing a method as shown in FIG. 18. As shown in FIG. 27, the second apparatus in this embodiment includes a first receiving unit 191 and a first processing unit 192. The first receiving unit 191 is configured to receive second information transmitted by a controller, where the second information includes a second flow entry, the second flow entry includes a work path flow entry and a protection path flow entry; where a match field of the work path flow entry includes a first tag, and an instruction field of the work path flow entry is used for instructing the second apparatus to pop the first tag in a second message and output a first message; a match field of the protection path flow entry includes a second tag, and an instruction field of the protection path flow entry includes a drop action; the first processing unit 192 is configured to pop the first tag in the second message according to the work path flow entry, output the first message, and drop a fourth message according to the protection path flow entry.

The work path and the protection path are determined by the controller, a first apparatus is a start node of the work path and the protection path, the second apparatus is an end node of the work path and the protection path, the first tag is a tag corresponding to the work path, and the second tag is a tag corresponding to the protection path.

Furthermore, the second apparatus in this embodiment may also include a second receiving unit 193 and a second processing unit 194. The second receiving unit 193 is configured to receive a flow table updating message transmitted by the controller, where the flow table updating message is used for instructing the second apparatus to update the protection path flow entry as a new protection path flow entry, and the flow table updating message is generated by the controller based on a notification message indicating that a failure occurs on the work path as received by the controller; a match field of the new protection path flow entry includes the second tag; and the second processing unit 194 is configured to pop the second tag in a sixth message according to the new protection path flow entry and output a fifth message, the sixth message is generated by the first apparatus through pushing the second tag into the fifth message, and the sixth message is transmitted by the first apparatus to the second apparatus via the protection path.

Furthermore, the flow table updating message received by the second receiving unit 193 is further configured to instruct the second apparatus to update the work path flow entry as a new work path flow entry; a match field of the new work path flow entry includes the first tag; the second processing unit 194 is further configured to drop an eighth message according to the new work path flow entry, where the eighth message is generated by the first apparatus through pushing the first tag into a seventh message, and the eighth message is transmitted by the first apparatus to the second apparatus via the work path.

In this embodiment, a second apparatus receives second information transmitted by a controller. The second information includes a second flow entry. The second flow entry includes a work path flow entry and a protection path flow entry. A match field of the work path flow entry includes a first tag, and an instruction field of the work path flow entry is used for instructing the second apparatus to pop the first tag in a second message and output a first message. A match field of the protection path flow entry includes a second tag, and an instruction field of the protection path flow entry includes a drop action. The second apparatus pops the first tag in the second message according to the protection path flow entry, outputs the first message, and drops a fourth message according to the protection path flow entry. Thus, when messages having same contents are transmitted to the second apparatus via a plurality of paths, the second apparatus selects to receive a message transmitted via a work path, thereby achieving a selective reception under the OpenFlow mechanism.

Figure 28:
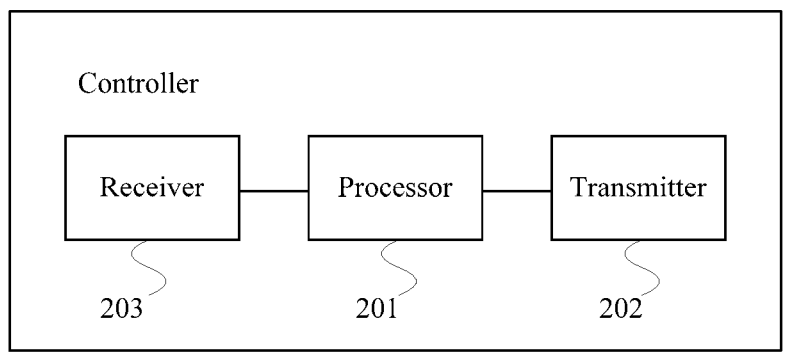
FIG. 28 is a schematic structural diagram of a controller device according to an embodiment of the present invention.

FIG. 28 is a schematic structural diagram of a controller device according to an embodiment of the present invention. As shown in FIG. 28, the controller provided in the embodiment of the present invention includes a processor 201 and a transmitter 202.

The processor 201 is configured to determine a work path and a protection path, where a start node of the work path and the protection path is a first apparatus, an end node of the work path and the protection path is a second apparatus, the work path corresponds to a first tag, and the protection path corresponds to a second tag.

The transmitter 202 is configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and is configured to transmit second information to the second apparatus, where the second information includes a second flow entry and a second group entry; the second flow entry includes a work path flow entry and a protection path flow entry; where a match filed of the work path flow entry includes the first tag, and an instruction field of the work path flow entry includes a second group action, an operand of the second group action is a second group identifier, and the second group action is used for instructing the second apparatus to associate the work path flow entry with the second group entry; a match field of the protection path flow entry includes the second tag, and an instruction field of the protection path flow entry includes a drop action, where the drop action is used for instructing the second apparatus to drop the received fourth message; the second group entry includes a third action bucket and a fourth action bucket, where the third action bucket is used for instructing the second apparatus to pop the first tag in the second message and output the first message, the fourth action bucket is used for instructing the second apparatus to pop the second tag in the fourth message and output the third message, the third action bucket is determined by the second apparatus to be live, and a group type of the second group entry is fast failover.

Furthermore, in the second information transmitted by the transmitter 202, the third action bucket includes a first action which is used for instructing the second apparatus to watch whether a failure occurs on the work path, and the fourth action bucket includes a second action which is used for instructing the second apparatus to watch whether a failure occurs on the protection path.

Optionally, in the second information transmitted by the transmitter 202, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

Furthermore, the controller also includes a receiver 203, which is configured to receive the updated protection path flow entry transmitted by the second apparatus.

The controller provided in the embodiment of the present invention may be used for executing the technical solutions of the above method embodiments, implementation principles and technical effects thereof are similar to those of the above method embodiments, and will not be repeated herein.

Figure 29:
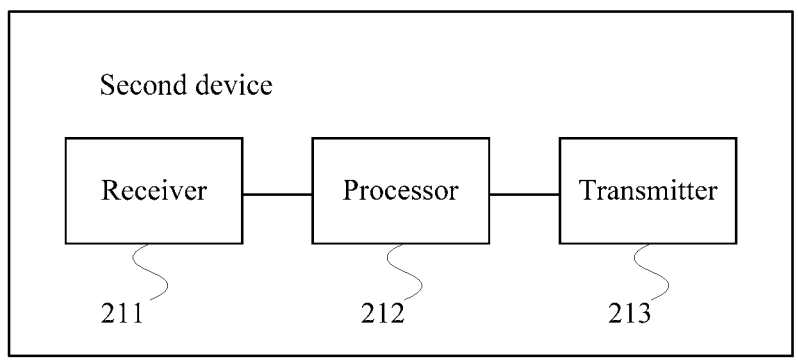
FIG. 29 is a schematic structural diagram of a second device according to an embodiment of the present invention.

FIG. 29 is a schematic structural diagram of a second device according to an embodiment of the present invention, as shown in FIG. 29, and the second device includes a receiver 211 and a processor 212.

The receiver 211 is configured to receive second information transmitted by a controller, where the second information includes a second flow entry and a second group entry; the second flow entry includes a work path flow entry and a protection path flow entry; where a match filed of the work path flow entry includes a first tag, and an instruction field of the work path flow entry includes a second group action, an operand of the second group action is a second group identifier, and the second group action is used for instructing the second apparatus to associate the work path flow entry with the second group entry; a match field of the protection path flow entry includes a second tag, and an instruction field of the protection path flow entry includes a drop action; the second group entry includes a third action bucket and a fourth action bucket, where the third action bucket is used for instructing the second apparatus to pop the first tag in a second message and output a first message, the fourth action bucket is used for instructing the second apparatus to pop the second tag in a fourth message and output a third message, the third action bucket is determined by the second apparatus to be live, and a group type of the second group entry is fast failover.

The processor 212 is configured to drop the fourth message according to the protection path flow entry, pop the first tag in the second message according to the work path flow entry and output the first message.

The second message is generated by a first apparatus through pushing the first tag into the first message, the fourth message is generated by the first apparatus through pushing the second tag into the third message, the third message is the same as the first message, the first tag corresponds to the work path, the second tag corresponds to the protection path, the work path and the protection path are determined by the controller, a start node of the work path and the protection path is the first apparatus, and an end node of the work path and the protection path is the second apparatus.

In the second flow table information received by the receiver 211, the third action bucket includes a first action which is used for instructing the second apparatus to watch whether a failure occurs on the work path, and the fourth action bucket includes a second action which is used for instructing the second apparatus to watch whether a failure occurs on the protection path.

Furthermore, the processor 212 is further configured to: determine that a failure occurs on the work path according to the second action; based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

Optionally, in the second flow table information received by the receiver 211, the third action bucket includes first state information identifying whether a failure occurs on the work path, the first state information is determined by the second apparatus according to the first action, and the fourth action bucket includes second state information identifying whether a failure occurs on the protection path, the second state information is determined by the second apparatus according to the second action.

Furthermore, the processor 212 is further configured to: determine that a failure occurs on the work path according to the first state information; based on the determined result, the second apparatus determines the fourth action bucket in the second group entry to be live; and updates the drop action in the instruction field of the protection path flow entry as the second group action, where an operand of the second group action is the second group identifier, and the second group action is used for instructing the second apparatus to associate the protection path flow entry with the second group entry.

Furthermore, the second device also includes a transmitter 213, which is configured to transmit the updated protection path flow entry to the controller.

The second device provided in the embodiment of the present invention may be used for executing the technical solutions of the above method embodiments, implementation principles and technical effects thereof are similar to those of the above method embodiments, and will not be repeated herein.

Figure 30:
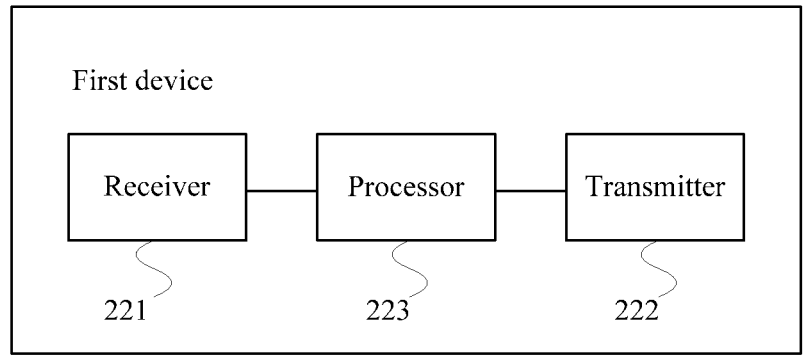
FIG. 30 is a schematic structural diagram of a first device according to an embodiment of the present invention.

FIG. 30 is a schematic structural diagram of a first device according to an embodiment of the present invention, as shown in FIG. 30, and the first apparatus includes a receiver 221 and a processor 223.

The receiver 221 is configured to receive first information transmitted by a controller, where the first information includes a first flow entry and a first group entry; where the first flow entry includes a match filed and an instruction field, the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push a first tag into a first message matching the first flow entry to generate a second message, and the second action bucket is used for instructing the first apparatus to push a second tag into a third message to generate a fourth message, and the third message is the same as the first message.

The processor 223 is configured to transmit the second message to a second apparatus via a work path according to the first information, and transmit the fourth message to the second apparatus via a protection path.

The work path and the protection path are determined by the controller, a start node of the work path and the protection path is the first apparatus, an end node of the work path and the protection path is the second apparatus, the work path corresponds to the first tag, and the protection path corresponds to the second tag.

The first device provided in the embodiment of the present invention may be used for executing the technical solutions of the above method embodiments, implementation principles and technical effects thereof are similar to those of the above method embodiments, and will not be repeated herein.

Figure 31:
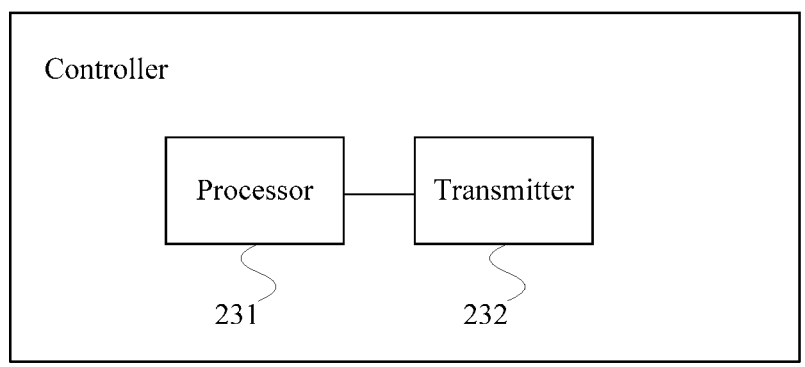
FIG. 31 is a schematic structural diagram of another controller device according to an embodiment of the present invention.

FIG. 31 is a schematic structural diagram of another controller device according to an embodiment of the present invention, as shown in FIG. 31, the controller includes a processor 231 and a transmitter 232.

The processor 231 is configured to determine a work path and a protection path, where a start node of the work path and the protection path is a first apparatus, an end node of the work path and the protection path is a second apparatus, the work path corresponds to a first tag, and the protection path corresponds to a second tag.

The transmitter 232 is configured to transmit first information to the first apparatus, where the first information includes a first flow entry and a first group entry; the first flow entry includes a match field and an instruction field, where the match field includes a destination identifier, and the instruction field includes a first group action, an operand of the first group action is a first group identifier, the first group action is used for instructing the first apparatus to associate the first flow entry with the first group entry, the first group entry includes a first action bucket and a second action bucket, a group type of the first group entry is ALL; where the first action bucket is used for instructing the first apparatus to push the first tag into a first message matching the first flow entry to generate a second message, and transmit the second message to the second apparatus via the work path, the second action bucket is used for instructing the second apparatus to push the second tag into a third message to generate a fourth message, and transmit the fourth message to the second apparatus via the protection path, the third message is the same as the first message; and is configured to transmit second information to the second apparatus, where the second information includes a second flow entry, and the second flow entry includes a work path flow entry and a protection path flow entry; where a match filed of the work path flow entry includes the first tag, and an instruction field of the work path flow entry is used for instructing the second apparatus to pop the first tag of the second message and output the first message; a match field of the protection path flow entry includes the second tag, and the instruction field of the protection path flow entry includes a drop action, where the drop action is used for instructing the second apparatus to drop the fourth message.

Furthermore, the processor 232 is further configured to: after receiving a notification message indicating that a failure occurs on the work path, transmit a flow table updating message to the second apparatus, where the flow table updating message is used for instructing the second apparatus to update the protection path flow entry as a new protection path flow entry; a match field of the new protection path flow entry includes the second tag, and an instruction field of the new protection path flow entry is used for instructing the second apparatus to pop the second tag in a sixth message and output a fifth message, where the sixth message is generated by the first apparatus through pushing the second tag into the fifth message.

Furthermore, the flow table updating message is further configured to instruct the second apparatus to update the work path flow entry as a new work path flow entry; a match field of the new work path flow entry includes the first tag, and an instruction field of the new work path flow entry is used for instructing the second apparatus to drop an eighth message, where the eighth message is generated by the first apparatus through pushing the first tag into a seventh message.

The controller provided in the embodiment of the present invention may be used for executing the technical solutions of the above method embodiments, implementation principles and technical effects thereof are similar to those of the above method embodiments, and will not be repeated herein.

Figure 32:
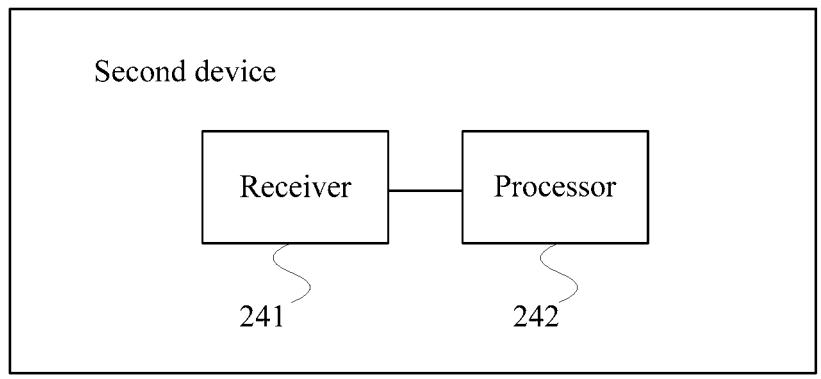
FIG. 32 is a schematic structural diagram of another second device according to an embodiment of the present invention.

FIG. 32 is a schematic structural diagram of another second device according to an embodiment of the present invention, as shown in FIG. 32, the second device includes a receiver 241 and a processor 242.

The receiver 241 is configured to receive second information transmitted by a controller, where the second information includes a second flow entry, the second flow entry includes a work path flow entry and a protection path flow entry; where a match field of the work path flow entry includes a first tag, and an instruction field of the work path flow entry is used for instructing the second apparatus to pop the first tag in a second message and output a first message; a match field of the protection path flow entry includes a second tag, and an instruction field of the protection path flow entry includes a drop action.

The processor 242 is configured to pop the first tag in the second message according to the work path flow entry, output the first message, and drop a fourth message according to the protection path flow entry.

The work path and the protection path are determined by the controller, a first apparatus is a start node of the work path and the protection path, the second apparatus is an end node of the work path and the protection path, the first tag is a tag corresponding to the work path, and the second tag is a tag corresponding to the protection path.

Furthermore, the receiver 241 is further configured to: receive a flow table updating message transmitted by the controller, where the flow table updating message is used for instructing the second apparatus to update the protection path flow entry as a new protection path flow entry, and the flow table updating message is generated by the controller based on a notification message indicating that a failure occurs on the work path as received by the controller; a match field of the new protection path flow entry includes the second tag; and the new protection path flow entry is used for instructing the second apparatus to pop the second tag in a sixth message and output a fifth message, the sixth message is generated by the first apparatus through pushing the second tag into the fifth message, and the sixth message is transmitted by the first apparatus to the second apparatus via the protection path.

Optionally, the flow table updating message is further configured to instruct the second apparatus to update the work path flow entry as a new work path flow entry; a match field of the new work path flow entry includes the first tag, the new work path flow entry is used for instructing the second apparatus to drop an eighth message, where the eighth message is generated by the first apparatus through pushing the first tag into a seventh message, and the eighth message is transmitted by the first apparatus to the second apparatus via the work path.

The second device provided in the embodiment of the present invention may be used for executing the technical solutions of the above method embodiments, implementation principles and technical effects thereof are similar to those of the above method embodiments, and will not be repeated herein.

Figure 33:
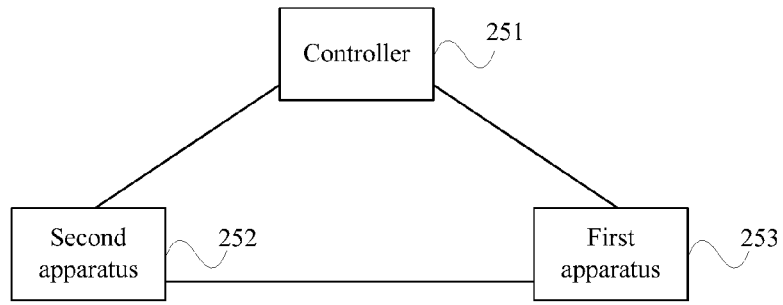
FIG. 33 is a schematic structural diagram of a system for transmitting information according to Embodiment 1 of the present invention.

FIG. 33 is a schematic structural diagram of a system for transmitting information according to Embodiment 1 of the present invention, as shown in FIG. 33, the system for transmitting information includes a controller 251, a second apparatus 252 and a first apparatus 253.

The controller 251 may use a structure of a device embodiment of FIG. 15, which may correspondingly implement technical solutions of the method embodiments, implementation principles and technical effects thereof are similar to those of the method embodiment, and will not be repeated herein.

The second apparatus 252 may use a structure of a device embodiment of FIG. 16, which may correspondingly implement technical solutions of the method embodiments, implementation principles and technical effects thereof are similar to those of the method embodiment, and will not be repeated herein.

The first apparatus 253 may use a structure of a device embodiment of FIG. 17, which may correspondingly implement technical solutions of the method embodiments, implementation principles and technical effects thereof are similar to those of the method embodiment, and will not be repeated herein.

Figure 34:
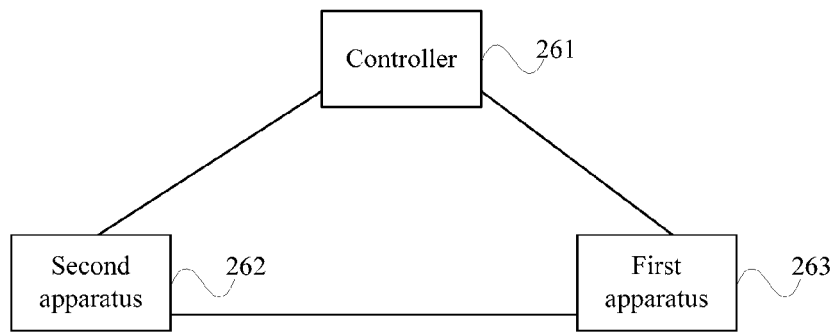
FIG. 34 is a schematic structural diagram of a system for transmitting information according to Embodiment 2 of the present invention.

FIG. 34 is a schematic structural diagram of a system for transmitting information according to Embodiment 2 of the present invention, as shown in FIG. 34, the system for transmitting information includes a controller 261, a second apparatus 262 and a first apparatus 263.

The controller 261 may use a structure of a device embodiment of FIG. 18, which may correspondingly implement technical solutions of the method embodiments, implementation principles and technical effects thereof are similar to those of the method embodiment, and will not be repeated herein.

The second apparatus 262 may use a structure of a device embodiment of FIG. 19, which may correspondingly implement technical solutions of the method embodiments, implementation principles and technical effects thereof are similar to those of the method embodiment, and will not be repeated herein.

The first apparatus 263 may use a structure of an apparatus embodiment of FIG. 17, which may correspondingly implement technical solutions of the method embodiments, implementation principles and technical effects thereof are similar to those of the method embodiment, and will not be repeated herein.

Figure 35:
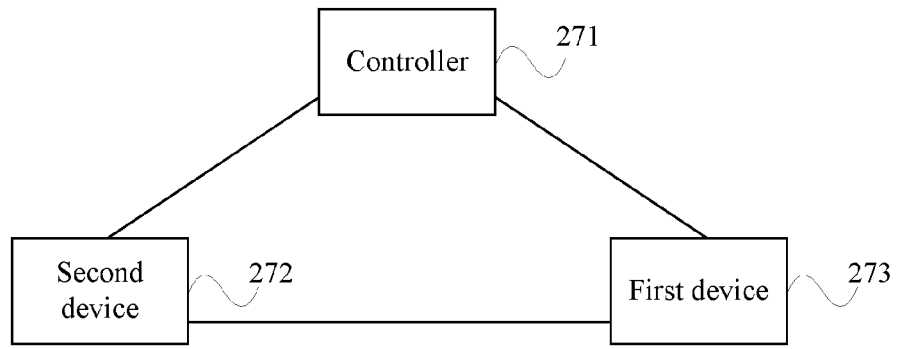
FIG. 35 is a schematic structural diagram of a system for transmitting information according to Embodiment 3 of the present invention.

FIG. 35 is a schematic structural diagram of a system for transmitting information according to Embodiment 3 of the present invention, as shown in FIG. 35, the system for transmitting information includes a controller 271, a second device 272 and a first device 273.

The controller 271 may use a structure of a device embodiment of FIG. 20, which may correspondingly implement technical solutions of the method embodiments, implementation principles and technical effects thereof are similar to those of the method embodiment, and will not be repeated herein.

The second device 272 may use a structure of a device embodiment of FIG. 21, which may correspondingly implement technical solutions of the method embodiments, implementation principles and technical effects thereof are similar to those of the method embodiment, and will not be repeated herein.

The first device 273 may use a structure of a device embodiment of FIG. 22, which may correspondingly implement technical solutions of the method embodiments, implementation principles and technical effects thereof are similar to those of the method embodiment, and will not be repeated herein.

Figure 36:
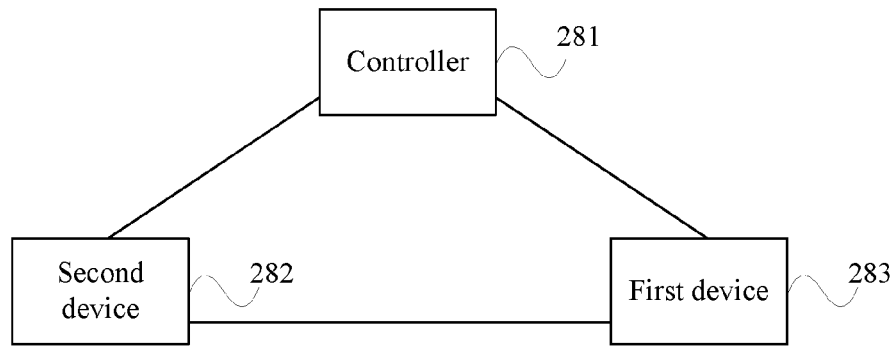
FIG. 36 is a schematic structural diagram of a system for transmitting information according to Embodiment 4 of the present invention.

FIG. 36 is a schematic structural diagram of a system for transmitting information according to Embodiment 4 of the present invention, as shown in FIG. 36, the system for transmitting information includes a controller 281, a second device 282 and a first device 283.

The controller 281 may use a structure of a device embodiment of FIG. 23, which may correspondingly implement technical solutions of the method embodiments, implementation principles and technical effects thereof are similar to those of the method embodiment, and will not be repeated herein.

The second device 282 may use a structure of a device embodiment of FIG. 24, which may correspondingly implement technical solutions of the method embodiments, implementation principles and technical effects thereof are similar to those of the method embodiment, and will not be repeated herein.

The first device 283 may use a structure of a devcie embodiment of FIG. 22, which may correspondingly implement technical solutions of the method embodiments, implementation principles and technical effects thereof are similar to those of the method embodiment, and will not be repeated herein.

In the embodiments provided in the present invention, it shall be appreciated that the disclosed apparatuses and methods may be implemented in other ways. For example, the aforementioned device embodiments are just exemplary. For example, the division of the units is just a logical function division, and there may be other division methods during practical implementation. For example, multiple units or components may be combined or integrated to another system, or some features may be omitted, or they are not executed. Another point is that the displayed or discussed mutual coupling, direct coupling or communication connection may be the indirect coupling or communication connection through some interfaces, devices or units, and may be electrical, mechanical, or in other forms.

The units described as separate components may be or may not be physically separated. The parts displayed as units may be or may not be physical units, that is, may be located at the same place or deployed on multiple network units. Some or all of the units may be selected according to an actual demand to implement objectives of solutions of the embodiments.

In addition, functional units in the respective embodiments of the present invention may be integrated into one processing unit, or exist as individual physical units, or two or more units may be integrated into one unit. The integrated unit may be implemented in a form of hardware or may be implemented in a form of a hardware plus software functional unit.

The above integrated unit implemented in the form of the software functional unit may be stored in a computer readable storage medium. The software functional unit is stored in a storage medium, including several instructions which enable a computer device (e.g., a personal computer, a server, or a network device) or a processor to perform a part of steps of methods according to embodiments of the present invention. The storage medium includes various mediums capable of storing program codes, such as a USB flash disk, a mobile hard disk, a read-only memory (English: Read-Only Memory, ROM for short), a random access memory (English: Random Access Memory, RAM for short), a magnetic disc, or an optical disc.

Persons skilled in the art may clearly know that, for a purpose of convenient and brief description, an example is made by means of division of the functional modules only, during actual use, the above functions may be assigned to different functional modules as required, that is, an internal structure of the device is divided into different functional modules to implement all or some functions described above. For a detailed working process of the described apparatus, reference may be made to corresponding process in the foregoing method embodiments, which will not be repeated herein.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for transmitting information, the method comprising:
    determining, by a controller, a work path and a protection path, wherein a start node of the work path and the protection path is a first apparatus, an end node of the work path and the protection path is a second apparatus, the work path corresponds to a first tag, and the protection path corresponds to a second tag;
    transmitting, by the controller, first information to the first apparatus, wherein the first information comprises a first flow entry and a first group entry; the first flow entry comprises a match field and an instruction field, wherein the match field comprises a destination identifier, and the instruction field comprises a first group action, an operand of the first group action is a first group identifier, the first group action is used for instructing the first apparatus to associate the first flow entry with the first group entry, the first group entry comprises a first action bucket and a second action bucket, a group type of the first group entry is ALL; wherein the first action bucket is used for instructing the first apparatus to push the first tag into a first message matching the first flow entry to generate a second message, and to transmit the second message to the second apparatus via the work path; wherein the second action bucket is used for instructing the first apparatus to push the second tag into a third message to generate a fourth message, and to transmit the fourth message to the second apparatus via the protection path, and wherein the third message is the same as the first message;
    transmitting, by the controller, second information to the second apparatus, wherein the second information comprises a second flow entry; the second flow entry comprises a work path flow entry and a protection path flow entry; wherein a match field of the work path flow entry comprises the first tag, and an instruction field of the work path flow entry is used for instructing the second apparatus to pop the first tag of the second message and to output the first message; a match field of the protection path flow entry comprises the second tag, and an instruction field of the protection path flow entry comprises a drop action, wherein the drop action is used for instructing the second apparatus to drop the fourth message.

2. The method according to claim 1, further comprising: after receiving a notification message indicating that a failure occurs on the work path, transmitting, by the controller, a flow table updating message to the second apparatus, wherein the flow table updating message is used for instructing the second apparatus to update the protection path flow entry as a new protection path flow entry; a match field of the new protection path flow entry comprises the second tag, and an instruction field of the new protection path flow entry is used for instructing the second apparatus to pop the second tag in a sixth message and to output a fifth message, wherein the sixth message is generated by the first apparatus through pushing the second tag into the fifth message.

3. The method according to claim 2, wherein, the flow table updating message is further configured to instruct the second apparatus to update the work path flow entry as a new work path flow entry; a match field of the new work path flow entry comprises the first tag, and an instruction field of the new work path flow entry is used for instructing the second apparatus to drop an eighth message, wherein the eighth message is generated by the first apparatus through pushing the first tag into a seventh message.

4. A controller comprising a processor and a non-transitory computer readable medium containing instructions that when executed by the processor causes the processor to:
    determine a work path and a protection path, wherein a start node of the work path and the protection path is a first apparatus, an end node of the work path and the protection path is a second apparatus, the work path corresponds to a first tag, and the protection path corresponds to a second tag;
    transmit first information to the first apparatus, wherein the first information comprises a first flow entry and a first group entry; the first flow entry comprises a match field and an instruction field, wherein the match field comprises a destination identifier, and the instruction field comprises a first group action, an operand of the first group action is a first group identifier, the first group action is used for instructing the first apparatus to associate the first flow entry with the first group entry, the first group entry comprises a first action bucket and a second action bucket, a group type of the first group entry is ALL; wherein the first action bucket is used for instructing the first apparatus to push the first tag into a first message matching the first flow entry to generate a second message, and to transmit the second message to the second apparatus via the work path; wherein the second action bucket is used for instructing the first apparatus to push the second tag into a third message to generate a fourth message, and to transmit the fourth message to the second apparatus via the protection path, wherein the third message is the same as the first message;

transmit second information to the second apparatus, wherein the second information comprises a second flow entry; the second flow entry comprises a work path flow entry and a protection path flow entry; wherein a match field of the work path flow entry comprises the first tag, and an instruction field of the work path flow entry is used for instructing the second apparatus to pop the first tag of the second message and to output the first message; a match field of the protection path flow entry comprises the second tag, and the instruction field of the protection path flow entry comprises a drop action, wherein the drop action is used for instructing the second apparatus to drop the fourth message.

5. The controller according to claim 4, wherein the processor is configured to:

after receiving a notification message indicating that a failure occurs on the work path, transmit a flow table updating message to the second apparatus, wherein the flow table updating message is used for instructing the second apparatus to update the protection path flow entry as a new protection path flow entry; a match field of the new protection path flow entry comprises the second tag, and an instruction field of the new protection path flow entry is used for instructing the second apparatus to pop the second tag in a sixth message and to output a fifth message, wherein the sixth message is generated by the first apparatus through pushing the second tag into the fifth message.

6. The controller according to claim 5, wherein, the flow table updating message is further configured to instruct the second apparatus to update the work path flow entry as a new work path flow entry; a match field of the new work path flow entry comprises the first tag, and an instruction field of the new work path flow entry is used for instructing the second apparatus to drop an eighth message, wherein the eighth message is generated by the first apparatus through pushing the first tag into a seventh message.

7. A controller, comprising:

a processor, configured to determine a work path and a protection path, wherein a start node of the work path and the protection path is a first apparatus, an end node of the work path and the protection path is a second apparatus, the work path corresponds to a first tag, and the protection path corresponds to a second tag;

a transmitter, configured to transmit first information to the first apparatus, wherein the first information comprises a first flow entry and a first group entry; the first flow entry comprises a match field and an instruction field, wherein the match field comprises a destination identifier, and the instruction field comprises a first group action, an operand of the first group action is a first group identifier, the first group action is used for instructing the first apparatus to associate the first flow entry with the first group entry, the first group entry comprises a first action bucket and a second action bucket, a group type of the first group entry is ALL; wherein the first action bucket is used for instructing the first apparatus to push the first tag into a first message matching the first flow entry to generate a second message, and to transmit the second message to the second apparatus via the work path; wherein the second action bucket is used for instructing the first apparatus to push the second tag into a third message to generate a fourth message, and to transmit the fourth message to the second apparatus via the protection path, wherein the third message is the same as the first message; and the transmitter is further configured to transmit second information to the second apparatus, wherein the second information comprises a second flow entry; the second flow entry comprises a work path flow entry and a protection path flow entry; wherein a match field of the work path flow entry comprises the first tag, and an instruction field of the work path flow entry is used for instructing the second apparatus to pop the first tag of the second message and to output the first message; a match field of the protection path flow entry comprises the second tag, and the instruction field of the protection path flow entry comprises a drop action, wherein the drop action is used for instructing the second apparatus to drop the fourth message.

8. The controller according to claim 7, wherein, the processor is further configured to:

after receiving a notification message indicating that a failure occurs on the work path, transmit a flow table updating message to the second apparatus, wherein the flow table updating message is used for instructing the second apparatus to update the protection path flow entry as a new protection path flow entry; a match field of the new protection path flow entry comprises the second tag, and an instruction field of the new protection path flow entry is used for instructing the second apparatus to pop the second tag in a sixth message and to output a fifth message, wherein the sixth message is generated by the first apparatus through pushing the second tag into the fifth message.

9. The controller according to claim 8, wherein, the flow table updating message is further configured to instruct the second apparatus to update the work path flow entry as a new work path flow entry; a match field of the new work path flow entry comprises the first tag, and an instruction field of the new work path flow entry is used for instructing the second apparatus to drop an eighth message, wherein the eighth message is generated by the first apparatus through pushing the first tag into a seventh message.

* * * * *